(12) United States Patent
Miller et al.

(10) Patent No.: US 12,441,815 B2
(45) Date of Patent: Oct. 14, 2025

(54) COMPOSITIONS AND METHODS FOR DIAGNOSIS OF CARDIOVASCULAR DISEASE

(71) Applicant: The Regents of the University of California, Oakland, CA (US)

(72) Inventors: Yury Miller, San Diego, CA (US); Ayelet Gonen, La Jolla, CA (US); Sotirios Tsimikas, Rancho Santa Fe, CA (US); Joseph L. Witztum, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 1200 days.

(21) Appl. No.: 17/290,843

(22) PCT Filed: Nov. 1, 2019

(86) PCT No.: PCT/US2019/059433
§ 371 (c)(1),
(2) Date: May 3, 2021

(87) PCT Pub. No.: WO2020/092928
PCT Pub. Date: May 7, 2020

(65) Prior Publication Data
US 2021/0388116 A1    Dec. 16, 2021

Related U.S. Application Data

(60) Provisional application No. 62/755,366, filed on Nov. 2, 2018.

(51) Int. Cl.
| | | |
|---|---|---|
| *C07K 16/44* | (2006.01) | |
| *A61K 39/00* | (2006.01) | |
| *A61K 51/10* | (2006.01) | |
| *G01N 33/569* | (2006.01) | |
| *G01N 33/92* | (2006.01) | |

(52) U.S. Cl.
CPC .......... *C07K 16/44* (2013.01); *A61K 51/1018* (2013.01); *G01N 33/56966* (2013.01); *G01N 33/92* (2013.01); *A61K 2039/505* (2013.01); *C07K 2317/21* (2013.01); *C07K 2317/24* (2013.01); *C07K 2317/565* (2013.01); *C07K 2317/622* (2013.01); *C12N 2510/02* (2013.01)

(58) Field of Classification Search
CPC ................ C07K 16/44; C07K 2317/21; C07K 2317/24; C07K 2317/565; C07K 2317/622; A61K 51/1018; A61K 2039/505; G01N 33/56966; G01N 33/92; C12N 2510/02
USPC ..... 530/387.1, 388.25, 391.3; 435/7.1, 7.21; 424/187.1, 135.1, 141.1
See application file for complete search history.

(56) References Cited

U.S. PATENT DOCUMENTS

| | | |
|---|---|---|
| 7,250,304 B2 | 7/2007 | Fogelman et al. |
| 2013/0089561 A1 | 4/2013 | Smith et al. |
| 2016/0363602 A1 | 12/2016 | Laaksonen et al. |
| 2017/0137533 A1 | 5/2017 | Williams et al. |
| 2017/0226195 A1 | 8/2017 | Lydon |

OTHER PUBLICATIONS

Clement et al. (2003) The Ovary, Second Edition, Chapter "Intracellular Cholesterol Dynamics in Steroidogenic Cells", doi.org/10.1016/B978-0-12-444562-8.X5000-9, pp. 1-3.*
Vajdos et al. (2002) J. Mol. Biol., vol. 320, 415-428.*
Chen et al. (1992) J. Exp. Med., vol. 176, 855-866.*
Sela-Culang et al. (2013) Frontiers in Immunology, vol. 4, pp. 1-13.*
Choi et al. (2013) PloS One , vol. 8(12), e83145, pp. 1-10.*
George et al. (2006) Eur. J. Heart Fail., vol. 8, 58-62.*
Copenheaver, Blaine R., International Search Report and Written Opinion, PCT/US2019/059433, Feb. 10, 2020.
Gonen et al., "A monoclonal antibody to assess oxidized cholesteryl esters associated with apoA1 and apoB-100 ipoproteins in human plasma," Journal of Lipid Research, Dec. 18, 2018, vol. 60, No. 2, pp. 436-445.
Wittmann-Regis, Agnes, International Preliminary Report on Patentability and Written Opinion, PCT/US2019/059433, The International Bureau of WIPO, May 14, 2021.

* cited by examiner

*Primary Examiner* — Anne Marie S Wehbe
(74) *Attorney, Agent, or Firm* — Gavrilovich, Dodd & Lindsey LLP

(57) ABSTRACT

Provided herein are new diagnostic biomarkers for cardiovascular disease, antibodies for detecting said diagnostic biomarkers, and immunoassays, imaging agents, and therapeutics based therefrom.

16 Claims, 9 Drawing Sheets
Specification includes a Sequence Listing.

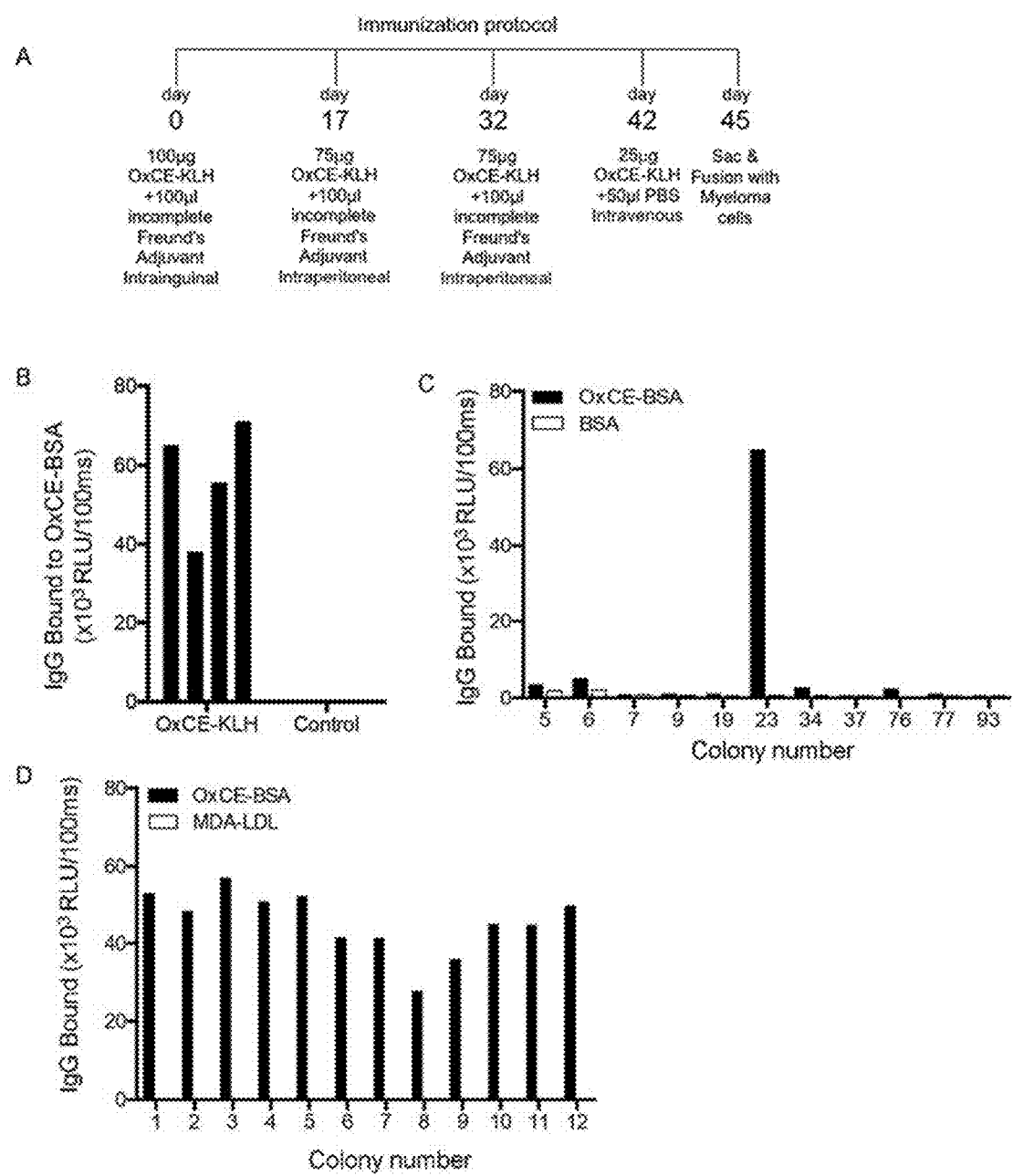
FIG. 1A-D

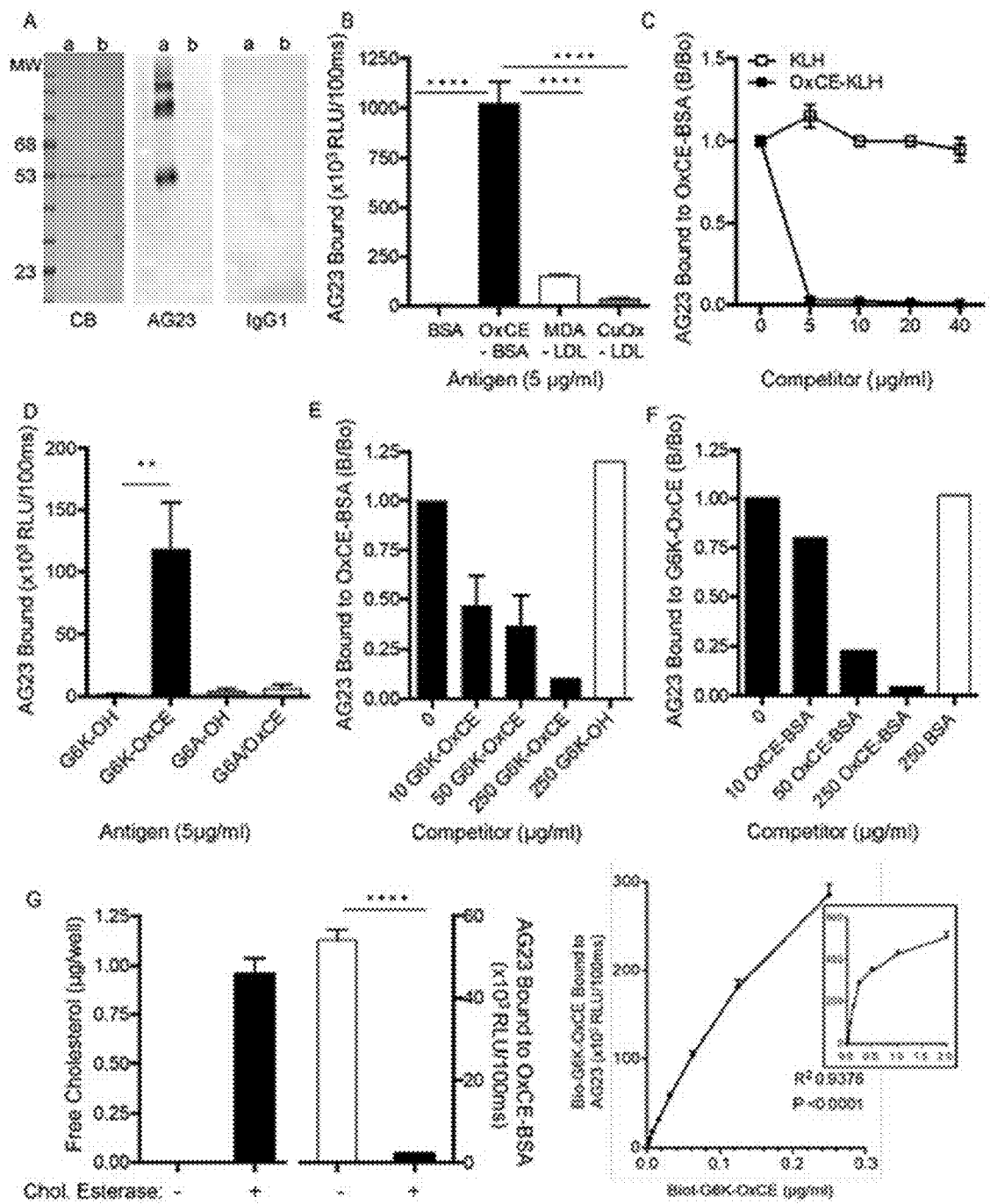
FIG. 2A-G

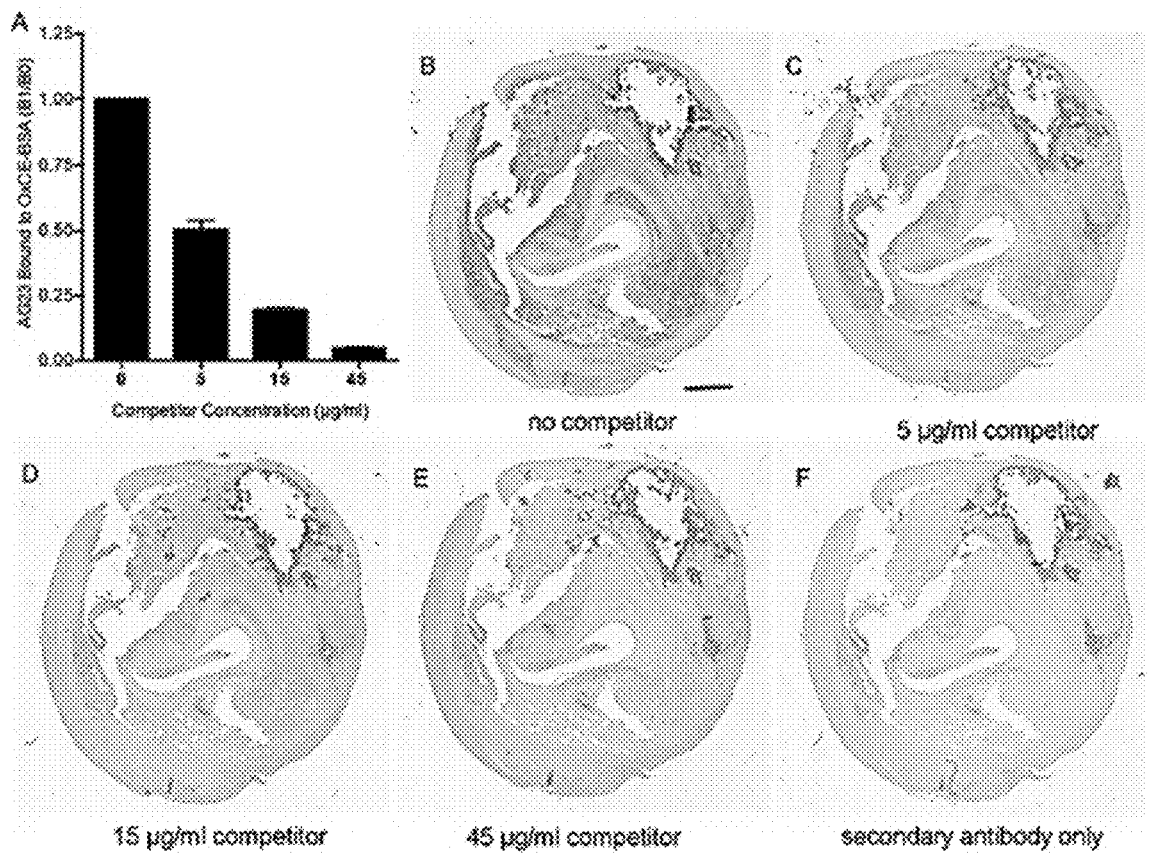
FIG. 3A-F
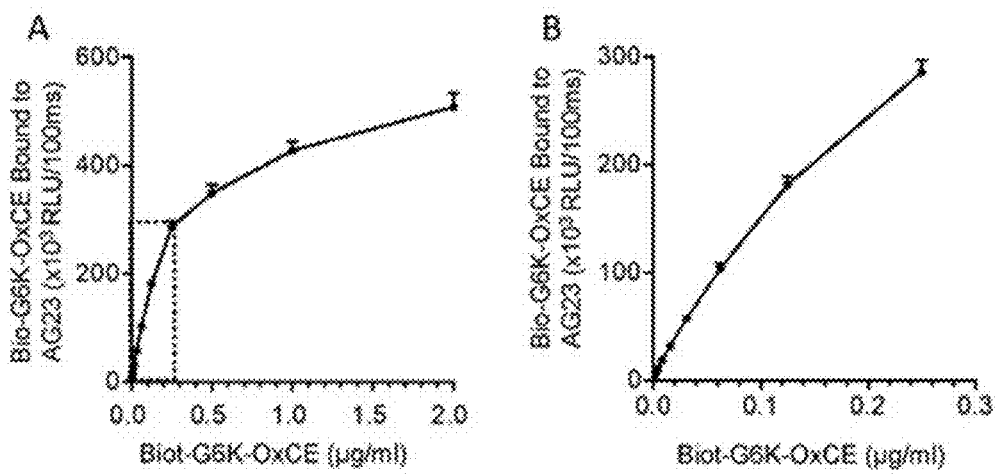
FIG. 4A-B

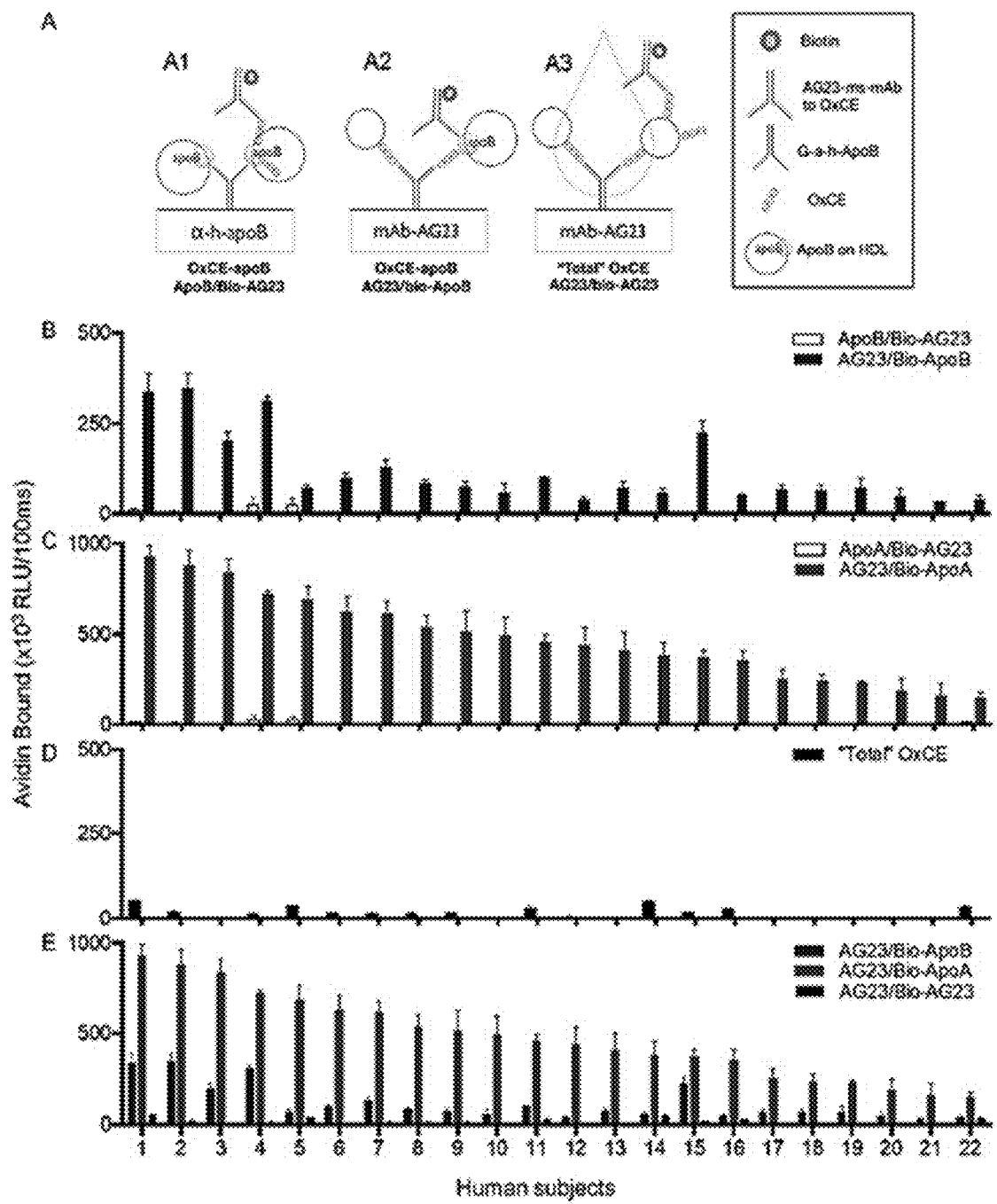
FIG. 5A-E

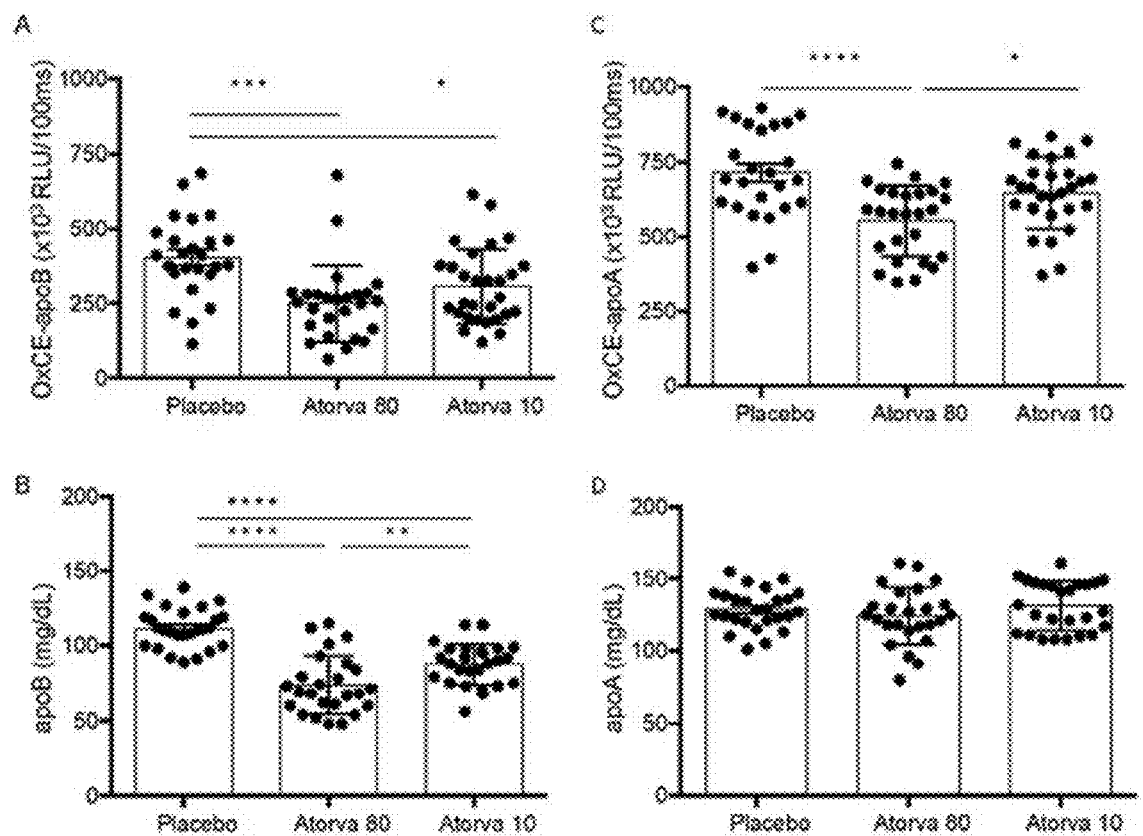
FIG. 6A-D

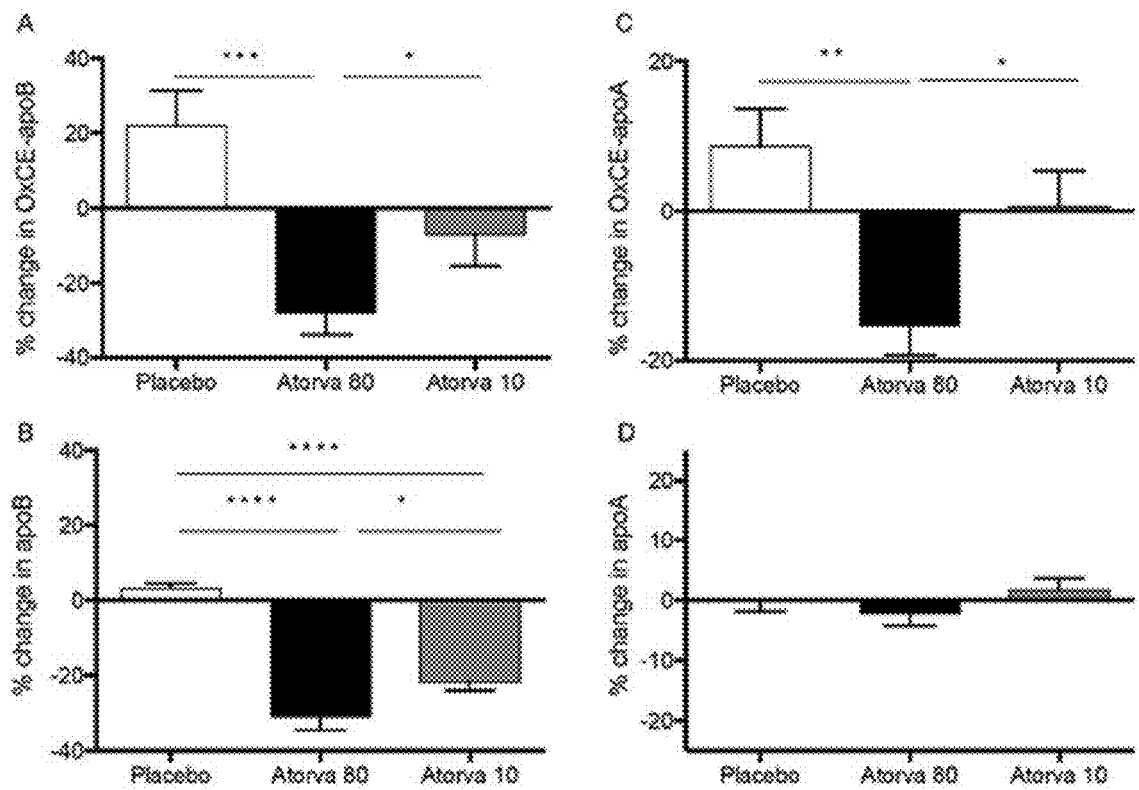
FIG. 7A-D
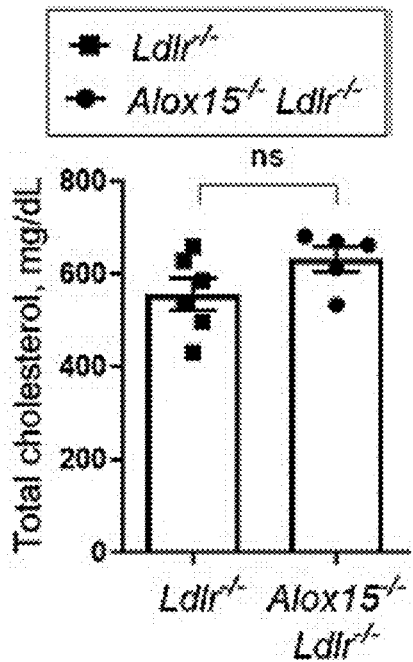
FIG. 8A

Variable heavy chain of AG23 (SEQ ID NO:1 - nucleic acid; SEQ ID NO:2 - polypeptide) (Bold/italic or underlined refer to HVR (CDR) domains)

```
gag gtc cag ctg cag cag tct gga cct gag ctg gtg aaa cct ggg gct tca gtg aag ata
 E   V   Q   L   Q   Q   S   G   P   E   L   V   K   P   G   A   S   V   K   I
tcc tgc aag gct tct ggt tac tca ttc act ggc tac tac atg aac tgg gtg agg caa agt
 S   C   K   A   S   G   Y   S   F   T   G   Y   Y   M   N   W   V   R   Q   S
cct gaa aag aac ctt gag tgg att gga gag att aat cct tac act ggt ggt acg acc tat
 P   E   K   N   L   E   W   I   G   E   I   N   P   Y   T   G   G   T   T   Y
aat cag aag ttc aag gcc agg gcc aca ttg act gta gac aaa tcc tcc agt aca gcc tac
 N   Q   K   F   K   A   R   A   T   L   T   V   D   K   S   S   S   T   A   Y
gtg cag ctc aag agc ctg aca tct gag gac tct gca gtt tat ttt tgt gta agt tgg gat
 V   Q   L   K   S   L   T   S   E   D   S   A   V   Y   F   C   V   S   W   D
tac gac ctt gac tac tgg ggc caa ggc acc act ctc aca gtc tcc tca gcc aaa acg aca
 Y   D   L   D   Y   W   G   Q   G   T   T   L   T   V   S   S   A   K   T   T
ccc cca tct gtc tat cca ctg gcc cct gga tct gct gcc caa act aac tcc atg gtg acc
 P   P   S   V   Y   P   L   A   P   G   S   A   A   Q   T   N   S   M   V   T
ctg gga tgc ctg gtc aag ggc tat ttc cct gag cca gtg aca gtg acc tgg aac tct gga
 L   G   C   L   V   K   G   Y   F   P   E   P   V   T   V   T   W   N   S   G
tcc ctg tcc agc ggt gtg cac acc ttc cca gct gtc ctg cag tct gac ctc tac act ctg
 S   L   S   S   G   V   H   T   F   P   A   V   L   Q   S   D   L   Y   T   L
agc agc tca gtg act gtc ccc tcc agc acc tgg ccc agc cag acc gtc acc tgc aac gtt
 S   S   S   V   T   V   P   S   S   T   W   P   S   Q   T   V   T   C   N   V
gcc cac ccg gcc agc agc acc aag gtg gac aag aaa att gtg ccc agg gat tgt ggt tgt
 A   H   P   A   S   S   T   K   V   D   K   K   I   V   P   R   D   C   G   C
aag cct tgc ata tgt aca gtc cca gaa gta tca tct gtc ttc atc ttc ccc cca aag ccc
 K   P   C   I   C   T   V   P   E   V   S   S   V   F   I   F   P   P   K   P
aag gat gtg ctc acc att act ctg act cct aag gtc acg tgt gtt gtg gta gac atc agc
 K   D   V   L   T   I   T   L   T   P   K   V   T   C   V   V   V   D   I   S
aag gat gat ccc gag gtc cag ttc agc tgg ttt gta gat gat gtg gag gtg cac aca gct
 K   D   D   P   E   V   Q   F   S   W   F   V   D   D   V   E   V   H   T   A
cag acg aaa ccc cgg gag gag cag atc aac agc act ttc cgt tca gtc agt gaa ctt ccc
 Q   T   K   P   R   E   E   Q   I   N   S   T   F   R   S   V   S   E   L   P
atc atg cac cag gac tgg ctc aat ggc aag gag ttc aaa tgc agg gtc aac agt gca gct
 I   M   H   Q   D   W   L   N   G   K   E   F   K   C   R   V   N   S   A   A
ttc cct gcc ccc atc gag aaa acc atc tcc aaa acc aaa ggc aga ccg aag gct cca cag
 F   P   A   P   I   E   K   T   I   S   K   T   K   G   R   P   K   A   P   Q
gtg tac acc att cca cct ccc aag gag cag atg gcc aag gat aaa gtc agt ctg acc tgc
 V   Y   T   I   P   P   P   K   E   Q   M   A   K   D   K   V   S   L   T   C
atg ata aca aac ttc ttc cct gaa gac att act gtg gag tgg cag tgg aat ggg cag cca
 M   I   T   N   F   F   P   E   D   I   T   V   E   W   Q   W   N   G   Q   P
gcg gag aac tac aag aac act cag ccc atc atg gac aca gat ggc tct tac ttc gtc tac
 A   E   N   Y   K   N   T   Q   P   I   M   D   T   D   G   S   Y   F   V   Y
agc aag ctc aat gtg cag aag agc aac tgg gag gca gga aat act ttc acc tgc tct gtg
 S   K   L   N   V   Q   K   S   N   W   E   A   G   N   T   F   T   C   S   V
tta tat gag ggc ctg cac aac cac cat act gag aag agc ctc tcc cac tct cct ggt aaa
 L   Y   E   G   L   H   N   H   H   T   E   K   S   L   S   H   S   P   G   K
```

*FIG. 9A*

Variable light chain of AG23 (SEQ ID NO:3 - nucleic acid; SEQ ID NO:4 - polypeptide) (Bold/italic or underlined refer to HVR (CDR) domains)

```
caa att gtt ctc acc cag tct cca gca ttc atg tct gca tct cca ggg gag aag gtc acc
 Q   I   V   L   T   Q   S   P   A   F   M   S   A   S   P   G   E   K   V   T
atg acc tgc agt gcc agc tca agt gta agt tac atg cac tgg tac cag cag aag tca ggc
 M   T   C   S   A   S   S   S   V   S   Y   M   H   W   Y   Q   Q   K   S   G
acg tcc ccc aaa aga tgg att tat gcc aca tcc aaa gtg gct tct ggg gtc cct gct cgc
 T   S   P   K   R   W   I   Y   A   T   S   K   V   A   S   G   V   P   A   R
ttc agt ggc agt ggg tct ggg acc tct tac tct ctc aca atc agc atg gag gct gaa
 F   S   G   S   G   S   G   T   S   Y   S   L   T   I   S   S   M   E   A   E
gat gct gcc act tat tac tgc ctg cag tgg agt agt aac cca tac acg ttc gga ggg ggg
 D   A   A   T   Y   Y   C   L   Q   W   S   S   N   P   Y   T   F   G   G   G
acc aag ctg gag ata aaa cgg gct gat gct gca cca act gta tcc atc ttc cca cca tcc
 T   K   L   E   I   K   R   A   D   A   A   P   T   V   S   I   F   P   P   S
agt gag cag tta aca tct gga ggt gcc tca gtc gtg tgc ttc ttg aac aac ttc tac ccc
 S   E   Q   L   T   S   G   G   A   S   V   V   C   F   L   N   N   F   Y   P
aaa gac atc aat gtc aag tgg aag att gat ggc agt gaa cga caa aat ggc gtc ctg aac
 K   D   I   N   V   K   W   K   I   D   G   S   E   R   Q   N   G   V   L   N
agt tgg act gat cag gac agc aaa gac agc acc tac agc atg agc agc acc ctc acg ttg
 S   W   T   D   Q   D   S   K   D   S   T   Y   S   M   S   S   T   L   T   L
acc aag gac gag tat gaa cga cat aac agc tat acc tgt gag gcc act cac aag aca tca
 T   K   D   E   Y   E   R   H   N   S   Y   T   C   E   A   T   H   K   T   S
act tca ccc att gtc aag agc ttc aac agg aat gag tgt
 T   S   P   I   V   K   S   F   N   R   N   E   C
```

*FIG. 9B*

COMPOSITIONS AND METHODS FOR DIAGNOSIS OF CARDIOVASCULAR DISEASE

REFERENCE TO RELATED APPLICATIONS

This application is a U.S. National Phase Application filed under 35 U.S.C. § 371 and claims priority to International Application No. PCT/US2019/059433, filed Nov. 1, 2019, which application claims priority to U.S. Provisional Application Ser. No. 62/755,366, filed Nov. 2, 2018, the disclosures of which are incorporated herein by reference in their entirety.

STATEMENT OF GOVERNMENT SUPPORT

This invention was made with government support under Grant Numbers HL088093 and HL136275, awarded by the National Institutes of Health. The government has certain rights in the invention.

TECHNICAL FIELD

Provided herein are new diagnostic biomarkers for cardiovascular disease, antibodies for detecting said diagnostic biomarkers, and immunoassays, imaging agents, and therapeutics based therefrom.

INCORPORATION BY REFERENCE OF SEQUENCE LISTING

Accompanying this filing is a Sequence Listing entitled "Sequence-Listing_ST25.txt", created on Nov. 1, 2019 and having 16,108 bytes of data, machine formatted on IBM-PC, MS-Windows operating system. The sequence listing is hereby incorporated herein by reference in its entirety for all purposes.

BACKGROUND

The concept of sterile inflammation induced by host-derived, damage-associated molecular patterns (DAMPs) helps explain inflammatory mechanisms of many chronic diseases. It is now well documented that DAMPs share structural motifs with microbial pathogen associated molecular patterns and activate innate immune, pattern-recognition receptors (PRRs). While these responses may provide initial benefits, the ensuing inflammatory responses may be harmful if unconstrained and prolonged, such as occurs in atherosclerosis, a life-long, chronic inflammation of medium/large arteries leading to cardiovascular disease (CVD).

SUMMARY

Atherosclerosis is associated with increased lipid peroxidation, leading to generation of multiple oxidation-specific epitopes (OSEs), contributing to the pathogenesis of atherosclerosis and its clinical manifestation. Oxidized cholesteryl esters (OxCE) is a major class of OSEs found in human plasma and atherosclerotic tissue. To evaluate OxCE as a candidate biomarker, the disclosure provides for the generation of novel antibodies that are highly specific to an OxCE modification of proteins. It was found that the antibodies of the disclosure (e.g., AG23) specifically stained human carotid artery atherosclerotic lesions. Further, immunoassays were developed that comprise the antibodies of the disclosure. For example, an ELISA method was developed to assay apoAI and apoB-100 lipoproteins that have one or more OxCE epitopes by using an antibody of the disclosure (e.g., AG23) as a capture antibody and either anti-apoAI or anti-apoB-100 as detection antibodies. It was found that OxCE-apoA or OxCE-apoB did not correlate with the well-established oxidized phospholipid OxPL-apoB biomarker. In a cohort of subjects treated with atorvastatin, OxCE-apoA was significantly lower than in the placebo group, even after adjustment to the apoAI levels. These results suggest the potential diagnostic utility of a new biomarker assay to measure OxCE-modified lipoproteins in patients with cardiovascular disease. In addition, there is the potential for use of the antibodies of the disclosure and/or derivatives thereof for applications, such as molecular imaging and therapeutic applications. For example, the antibodies of the disclosure and/or derivatives thereof can be used to detect and/or neutralize proinflammatory and atherogenic OxCE epitopes.

The disclosure provides for antibody or antibody fragments comprising a variable heavy chain. In one embodiment the isolated antibody or antibody fragment comprises a variable heavy chain ($V_H$) corresponding to amino acids 1 to 115 of SEQ ID NO:2. In a further embodiment, an antibody fragment of the disclosure can have heavy chain complementarity determining regions (CDRs) comprising amino acids 26 to 30 of SEQ ID NO:2 (CDR-H1), amino acids 51 to 58 of SEQ ID NO:2 (CDR-H2) and amino acids 96 to 106 of SEQ ID NO:2 (CDR-H3), wherein CDR-H1, -H2 and -H3 are separated by one another by framework antibody sequences. In a further embodiment, the $V_H$ can be linked to a heavy chain constant region ($C_H$). The $C_H$ can be from various organisms. For example, in one embodiment, the $C_H$ is murine and comprises amino acids 116 to 440 of SEQ ID NO:2 corresponding to IgG1 Fc of *Mus musculus*.

The disclosure provides for antibody or antibody fragments comprising a variable light chain. In one embodiment the isolated antibody or antibody fragment comprises a variable light chain ($V_L$) corresponding to amino acids 1 to 107 of SEQ ID NO:4. In a further embodiment, an antibody fragment of the disclosure can have light chain complementarity determining regions (CDRs) comprising amino acids 27 to 31 of SEQ ID NO:4 (CDR-L1), amino acids 49 to 51 of SEQ ID NO:4 (CDR-L2) and amino acids 87 to 97 of SEQ ID NO:4 (CDR-L3), wherein CDR-L1, -L2 and -L3 are separated by one another by framework antibody sequences. In a further embodiment, the $V_L$ can be linked to a light chain constant region ($C_L$). The $C_L$ can be from various organisms. For example, in one embodiment, the $C_L$ is murine and comprises amino acids 108 to 213 of SEQ ID NO:4 corresponding to kappa light-chain constant region of *Mus musculus*.

The disclosure provides an isolated antibody or antibody fragment that recognizes and binds to an oxidized cholesteryl ester (OxCE) epitope, wherein the antibody or antibody fragment comprises a variable heavy chain ($V_H$) domain and/or a variable light chain ($V_L$) domain; wherein the $V_L$ domain comprises a sequence that (i) contains complementarity determining regions (CDRs) of SEQ ID NO:4 from amino acid 24 to 33 (CDR-L1), amino acid 49 to 55 (CDR-L2), and amino acids 88 to 96 (CDR-L3); (ii) has at least 75%, 80%, 85%, 90%, 95%, 98%, 99% or 100% sequence identity to the sequence of SEQ ID NO:4 (from amino acid 1 to 107) or (iii) 75%, 80%, 85%, 90%, 95%, 98%, 99% or 100% sequence identity to SEQ ID NO:4; and wherein the $V_H$ domain comprises a sequence that (i) contains complementarity determining regions (CDRs) of SEQ ID NO:2 from amino acid 26 to 35 (CDR-H1), amino acid 50 to 66 (CDR-H2), and amino acids 99 to 105 (CDR-H3); (ii) has at least 75%, 80%, 85%, 90%, 95%, 98%, 99% or 100% sequence identity to the sequence of SEQ ID NO:2 (from amino acid 1 to 115) or (iii) 75%, 80%, 85%, 90%, 95%, 98%, 99% or 100% sequence identity to SEQ ID NO:2. In another or further embodiment, the VH domain comprises the sequence of SEQ ID NO:2 with 1 to 15 conservative amino acid substitutions. In another or further embodiment, the $V_H$ domain comprises the sequence of SEQ ID NO:2. In another or further embodiment, the $V_L$ domain comprises the sequence of SEQ ID NO:4, but with 1 to 15 conservative amino acid substitutions in the sequence. In another or further embodiment, the $V_L$ domain comprises the sequence of SEQ ID NO:4. In another or further embodiment, the isolated antibody is a monoclonal antibody. In another or further embodiment, the isolated antibody is a murine monoclonal antibody. In another or further embodiment, the antibody is a humanized antibody. In another or further embodiment, the heavy and light chain domains are linked to an Fc region. In another or further embodiment, the antibody is further conjugated to an enzyme, a fluorophore, a hapten, an imaging agent, a radiolabel, or a contrast agent. In another or further embodiment, the enzyme is selected from alkaline phosphatase, s-galactosidase, luciferase, and horseradish peroxidase. In another or further embodiment, the fluorophore is a near UV fluorescent dye, a visible fluorescent dye, a near IR fluorescent dye, rhodamine, or fluorescein isothiocyanate. In another or further embodiment, the hapten is selected from biotin, a biomagnetic particle, streptavidin, or protein A/G.

The disclosure also provides a single chain variable fragment ("scFv") that recognizes an oxidized cholesteryl ester (OxCE) epitope and which comprises a $V_H$ domain, the $V_H$ domain comprises a sequence that (i) contains complementarity determining regions (CDRs) of SEQ ID NO:2 from amino acid 26 to 35 (CDR-H1), amino acid 50 to 66 (CDR-H2), and amino acids 99 to 105 (CDR-H3); (ii) has at least 75%, 80%, 85%, 90%, 95%, 98%, 99% or 100% sequence identity to the sequence of SEQ ID NO:2 (from amino acid 1 to 115) or (iii) 75%, 80%, 85%, 90%, 95%, 98%, 99% or 100% sequence identity to SEQ ID NO:2; and the $V_L$ domain comprises a sequence that (i) contains complementarity determining regions (CDRs) of SEQ ID NO:4 from amino acid 24 to 33 (CDR-L1), amino acid 49 to 55 (CDR-L2), and amino acids 88 to 96 (CDR-L3); (ii) has at least 75%, 80%, 85%, 90%, 95%, 98%, 99% or 100% sequence identity to the sequence of SEQ ID NO:4 (from amino acid 1 to 107) or (iii) 75%, 80%, 85%, 90%, 95%, 98%, 99% or 100% sequence identity to SEQ ID NO:4. In one embodiment, the scFv is soluble under physiological conditions. In another or further embodiment, the $V_H$ domain comprises the sequence of SEQ ID NO:2, but with 1 to 15 conservative amino acid substitutions in the sequence. In another or further embodiment, the $V_H$ domain comprises the sequence of SEQ ID NO:2. In another or further embodiment, the $V_L$ domain comprises the sequence of SEQ ID NO:4, but with 1 to 15 conservative amino acid substitutions in the sequence. In another or further embodiment, the $V_L$ domain comprises the sequence of SEQ ID NO:4. In another or further embodiment, the scFV comprises an Fc region that is human or humanized. In another or further embodiment, the $V_H$ domain and the $V_L$ domain are human or humanized, and wherein the scFV comprises a non-human Fc region. In another or further embodiment, the scFV is further conjugated to an enzyme, a fluorophore, a hapten, an imaging agent, a radiolabel, or a contrast agent. In another or further embodiment, the enzyme is selected from alkaline phosphatase, β-galactosidase, luciferase, and horseradish peroxidase. In another or further embodiment, the fluorophore is a near UV fluorescent dye, a visible fluorescent dye, a near IR fluorescent dye, rhodamine, or fluorescein isothiocyanate. In another or further embodiment, the hapten is selected from biotin, a biomagnetic particle, streptavidin, or protein A/G.

The disclosure also provides a polynucleotide that encodes the isolated antibody or antibody fragment of any one of the foregoing. In one embodiment, the antibody or antibody fragment comprises a nucleotide sequence of SEQ ID NO:1 and/or 3. One of skill in the art can readily deduce the nucleotide sequence for each CDR of the light and heavy chain from the accompanying sequence listing.

The disclosure also provides a vector comprising a polynucleotide of the disclosure.

The disclosure also provides a host cell transformed with a polynucleotide or a vector of the disclosure.

The disclosure provides a transgenic animal, comprising a polynucleotide or a vector of the disclosure. In one embodiment, the transgenic animal is a transgenic mouse.

The disclosure also provides a method of detecting oxidized cholesteryl esters (OxCE) and covalent modifications of proteins and peptides with OxCE in a sample obtained from a subject comprising: contacting the sample with the isolated antibody or antibody fragment of as described herein, or the scFV of the disclosure; adding a detecting agent to quantify and/or detect the amount of isolated antibody or antibody fragment in the sample.

The disclosure provides an immunoassay comprising: (1) a capture antibody; and (2) a detection antibody that is conjugated to a detectable label wherein the capture antibody or the detection antibody is the isolated antibody or antibody fragment or scFv of the disclosure. In another or further embodiment, the capture antibody or the detection antibody that is not the isolated antibody or antibody fragment or the scFv of the disclosure, is antibody specific for human apoB-100, an antibody specific for human apoAI, an antibody specific for mouse IgG, an antibody specific for human LDL, and an antibody specific for human OxLDL.

The disclosure also provides a method of treating a subject with a disease or disorder associated with OxCE or increased levels thereof, comprising administering to the subject the isolated antibody or antibody fragment or the scFV of the disclosure, wherein the antibody or antibody fragment or scFV binds to and inhibits the biological effect caused by OxCE. In another or further embodiment, the subject has a cardiovascular disease or disorder.

The disclosure also provides a method of imaging atherosclerotic lesions in a subject, comprising administering to a subject having or suspected of having atherosclerotic lesions the isolated antibody or antibody fragment or the scFV of the disclosure wherein the antibody or the antibody fragment or the scFV are conjugated an imaging agent, a radiolabel, or a contrast agent.

The details of one or more embodiments of the disclosure are set forth in the accompanying drawings and the description below. Other features, objects, and advantages will be apparent from the description and drawings, and from the claims.

BRIEF DESCRIPTION OF THE DRAWINGS

The accompanying drawings, which are incorporated into and constitute a part of this specification, illustrate one or more embodiments of the disclosure and, together with the detailed description, serve to explain the principles and implementations of the invention.

FIG. 1A-D provides for the generation of OxCE-specific mAb. (A) Immunization protocol. (B) Following 2nd boost (day 40), mice were bled and 1:100 plasma samples were tested by ELISA, using OxCE-BSA as an antigen. The graph represents the mean of duplicate measurements from four immunized mice and four control (non-immunized) mice. (C) Ninety six hybridoma colonies were collected, expanded, and screened in ELISA against 5 µg/mL OxCE-BSA and BSA. The graph shows a representative result of multiple screening rounds. The positive colony #23 was retested 10 times and designated AG23. (D) To ensure monoclonality, AG23 was subjected to single cell dilution using semi-solid gel without HAT. Twenty-four colonies were collected and expanded. Media were tested 2 times by ELISA using 5 µg/mL OxCE-BSA and MDA-LDL. The graph shows 12 representative colonies (in technical triplicates).

FIG. 2A-G demonstrates AG23 specificity to OxCE epitope. (A) OxCE-BSA (a) and unmodified BSA (b) were loaded on a 4-12% Bis-Tris SDS gel at 0.5 µg/well. Gel was stained with Coomassie blue (CB) or blotted and probed with OxCE-specific AG23 mAb or a mouse anti-KLH IgG1. Representative gel and blots from 20 repeats. (B) Representative results of AG23 (0.125 µg/mL) binding to BSA, OxCE-BSA, MDA-LDL and CuOxLDL (5 µg/mL). Four different OxCE-BSA preparations were tested in 12 independent experiments, with AG23 concentrations ranging from 0.125 to 1 mg/mL. The graph shows the mean of 3 repeats, each in 3 technical replicates. Mean±SD; one-way ANOVA with multiple comparisons; **, P<0.0001. (C) Competition ELISA: AG23 (0.01 µg/mL) was preincubated in the absence or presence of increasing concentrations of non-modified KLH or OxCE-KLH. Immune complexes were spun down, and supernatants were tested for binding to OxCE-BSA (5 µg/mL). Each data point is the mean of two independent assays in technical triplicates. (D) AG23 (1 µg/mL) binding to 10 µg/mL of non-modified G6K-OH and G6A-OH peptides, and the peptides subjected to the OxCE covalent modification. G6K-OxCE designates covalent modification of Lys, and G6A/OxCE designates the reaction that did not result in covalent modification of Ala. Mean±SD; n=6 for G6K and n=2 for G6A, each in technical duplicates; one-way ANOVA with multiple comparisons; , P<0.01. (E-F) AG23 (0.15 µg/mL) was preincubated overnight with non-modified (250 µg/mL) or OxCE-modified (10-250 µg/mL) BSA or GDGDGK-OH peptide. Following spin down of immune complexes, supernatants were tested for binding with OxCE-BSA (E) or G6K-OxCE (F). Graphs show results of a representative experiment performed in triplicates (E) or duplicates (F). OxCE-BSA, 5 µg/mL; G6K-OxCE was tested at 4 different concentrations in the range of 5-25 µg/mL. (G) OxCE plated at 1.25 µg/well in a 96-well plate was incubated with or without cholesterol esterase (10 u/well) for 3 h at 37° C. The solution was collected and pooled for free cholesterol measurements. After washes, AG23 binding to the wells was measured. Mean±SD, n=5; ****, P<0.0001 (Student's t-test) for AG23 assay. Free cholesterol assay, technical triplicates of samples pooled from 5 wells.

FIG. 3A-E shows AG23-specific epitopes in human atherosclerotic lesions. (A) Competition of increasing concentrations of OxCE-BSA in solution for AG23 (0.1 µg/mL) binding to the plated OxCE-BSA antigen (0.5 µg/mL) was tested in an ELISA format. A representative result performed in technical triplicates. (B-E) Consecutive cross-sections of human carotid endarterectomy specimens were stained with AG23, preincubated in the absence or presence of increasing concentrations of OxCE-BSA as a competitor. (F) Secondary antibody only. Representative images of 3 specimens tested. Scale bar, 1 mm.

FIG. 4A-B provides for the dynamic range of G6-OxCE capture on AG23-coated plate. Increasing concentrations of biotinylated G6-OxCE were added to a plate coated with AG23 (5 µg/mL). G6K-OxCE binding was detected with neutravidin-AP. (B) is a zoom in of the boxed area in panel (A). Mean±SE; average of 2 experiments, each in 8 technical replicates (n=16).

FIG. 5A-E presents the development of OxCE Immunoassays. (A) Schematic representation of ELISA formats for OxCE detection in human plasma. See Examples for details. (B-E) Results of different OxCE assays for 22 plasma samples from the UVA cohort representing the range of variation. Mean±SD of technical triplicates for each sample. Note different scales and that absolute values cannot be compared between the assays because of use of different detection antibodies.

FIG. 6A-D demonstrates the effect of atorvastatin vs. placebo treatment on OxCE-apoB and OxCE-apoA levels. Plasma samples collected from subjects after a 16-week treatment with placebo (n=25), atorvastatin (Atorva) 80 mg (n=26) or 10 mg (n=29) were tested for OxCE-apoB (A) and OxCE-apoA (C). The plasma apoB (B) and apoA (D) levels are from the original PROXI study as reported. Each data point is mean of 3 technical replicates. Mean±SEM, one-way ANOVA with multiple comparisons; *, P<0.05; , P<0.01; *, P<0.001; ****, P<0.0001.

FIG. 7A-D presents changes in OxCE-apoB and OxCE-apoA parameters from baseline to post-treatment with atorvastatin vs. placebo. Individual changes from baseline to post-treatment were calculated for OxCE-apoB (A), apoB (B), OxCE-apoA (C), and apoA (D). Placebo (n=24), atorvastatin (Atorva) 80 mg (n=25) or 10 mg (n=25) groups. Differences in subject numbers between FIGS. 6 and 7 are due to missing baseline samples. Mean±SEM, one-way ANOVA with multiple comparisons; *, P<0.05; , P<0.01; *, P<0.001; ****, P<0.0001.

FIG. 8A-C shows AG23-specific epitopes in mouse plasma of $Ldlr^{-/-}$ and $Alox15^{-/-}$ $Ldlr^{-/-}$ mice. (A) Plasma TC from mice fed a 1% cholesterol normal fat diet for 16 weeks. (B) OxCE levels were measured in mouse plasma in a sandwich ELISA using nonlabeled AG23 as a capture Ab and biotinylated AG23 as a detection Ab. (C) Sections of the aortic root were collected, and lesion size was measured starting from the appearance of first leaflet in 100 µm increments. Mean±SEM; n=6 ($Ldlr^{-/-}$) and n=5 ($Alox15^{-/-}$ $Ldlr^{-/-}$); *P<0.05; **P<0.01. Unpaired t-test with Welch's correction (A, B) and two-way ANOVA with Bonferroni posttest (C).

FIG. 9A-B provides antibody sequence information. (A) provides nucleic acid and polypeptide sequences for the heavy chain (SEQ ID NO:1 and 2, respectively). (B) provides nucleic acid and polypeptide sequences for the light chain (SEQ ID NO:3 and 4, respectively).

DETAILED DESCRIPTION

Figure 8B:
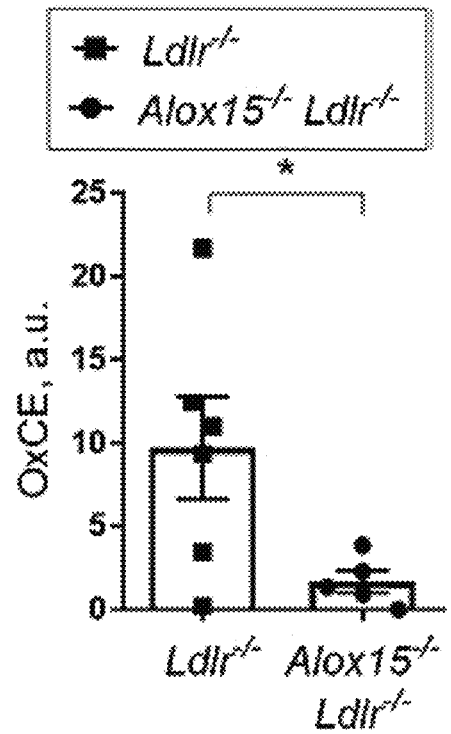

As used herein and in the appended claims, the singular forms "a," "an," and "the" include plural referents unless the context clearly dictates otherwise. Thus, for example, reference to "a polynucleotide" includes a plurality of such polynucleotides and reference to "the antibody" includes reference to one or more antibodies, and so forth.

Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein.

Also, the use of "or" means "and/or" unless stated otherwise. Similarly, "comprise," "comprises," "comprising" "include," "includes," and "including" are interchangeable and not intended to be limiting.

It is to be further understood that where descriptions of various embodiments use the term "comprising," those skilled in the art would understand that in some specific instances, an embodiment can be alternatively described using language "consisting essentially of" or "consisting of."

All publications mentioned herein are incorporated by reference in full for the purpose of describing and disclosing methodologies that might be used in connection with the description herein. Moreover, with respect to any term that is presented in one or more publications that is similar to, or identical with, a term that has been expressly defined in this disclosure, the definition of the term as expressly provided in this disclosure will control in all respects.

The disclosure provides studies looking at whether immunological detection of OxCE epitopes in plasma may have diagnostic value and serve as a new biomarker. In particular, the disclosure describes the generation of antibodies directed to oxidation-specific epitopes, specifically OxCE, a damage-associated molecular pattern (DAMP) associated with atherosclerosis. The antibodies of the disclosure can be used as a biomarker, molecular imaging agent and therapeutic ("biotheranostic") for treating diseases associated with OxCE occurrence or production. For example, antibody and antibody fragments of the disclosure can be used as a "passive vaccination" approach to prevent diseases, e.g., atherosclerosis. Thus, the antibodies of the disclosure can be used in a variety of settings, including immunoassays in plasma in clinical and research assays, immunostaining of tissues, molecular imaging after adding appropriate tags and as an infusion for therapeutic purposes in humans.

As used herein, the term "about" means that the numerical value is approximate and small variations would not significantly affect the practice of the disclosed embodiments. Where a numerical limitation is used, unless indicated otherwise by the context, "about" means the numerical value can vary by ±10% or in the case of reference to a polypeptide sequence or nucleic acid sequence position that the sequence location (e.g., about amino acid 107) can vary by 1 to 5 positions to either side of the referenced position. For example, there are numerous algorithms that can predict sequence structure that result in slight variations of 1 to 3 amino acids in either direction. Such variation remain within the scope of the disclosed embodiments.

The terms "antibody" and "immunoglobulin" are used interchangeably in the broadest sense and include monoclonal antibodies (e.g., full length or intact monoclonal antibodies), polyclonal antibodies, multivalent antibodies, multi-specific antibodies (e.g., bispecific antibodies so long as they exhibit the desired biological activity) and may also include certain antibody fragments. An antibody can be human, humanized and/or affinity matured.

Depending on the amino acid sequence of the constant domain of their heavy chains, immunoglobulins can be assigned to different classes. There are five major classes of immunoglobulins: IgA, IgD, IgE, IgG, and IgM, and several of these can be further divided into subclasses (isotypes), e.g., IgG$_1$, IgG$_2$, IgG$_3$, IgG$_4$, IgA$_1$, and IgA$_2$. The heavy-chain constant domains that correspond to the different classes of immunoglobulins are called α, δ, ε, γ, and μ, respectively. The subunit structures and three-dimensional configurations of different classes of immunoglobulins are known.

"Antibody-dependent cell-mediated cytotoxicity" or "ADCC" refers to a form of cytotoxicity in which secreted Ig bound onto Fc receptors (FcRs) present on certain cytotoxic cells (e.g., NK cells, neutrophils, and macrophages) enable these cytotoxic effector cells to bind specifically to an antigen-bearing target cell and subsequently kill the target cell with cytotoxins. The primary cells for mediating ADCC, NK cells, express FcγRIII only, whereas monocytes express FcγRI, FcγRII, and FcγRIII. FcR expression on hematopoietic cells is summarized in Table 3 on page 464 of Ravetch and Kinet, *Annu. Rev. Immunol* 9:457-92 (1991). To assess ADCC activity of a molecule of interest, an in vitro ADCC assay, such as that described in U.S. Pat. No. 5,500,362 or 5,821,337 or U.S. Pat. No. 6,737,056 (Presta), may be performed. Useful effector cells for such assays include PBMC and NK cells. Alternatively, or additionally, ADCC activity of the molecule of interest may be assessed in vivo, e.g., in an animal model such as that disclosed in Clynes et al. PNAS (USA) 95:652-656 (1998).

"Antibody fragments" comprise only a portion of an intact antibody, wherein the portion typically retains at least one, more commonly most or all, of the functions normally associated with that portion when present in an intact antibody. Examples of antibody fragments include Fab, Fab', F(ab')$_2$, and Fv fragments; diabodies; linear antibodies; single-chain antibody molecules; and multi-specific antibodies formed from antibody fragments. In one embodiment, an antibody fragment comprises an antigen binding site of the intact antibody and thus retains the ability to bind antigen. In another embodiment, an antibody fragment, for example one that comprises the Fc region, retains at least one of the biological functions normally associated with the Fc region when present in an intact antibody, such as FcRn binding, antibody half-life modulation, ADCC function and complement binding. In one embodiment, an antibody fragment is a monovalent antibody that has an in vivo half-life substantially similar to an intact antibody. For example, such an antibody fragment may comprise on antigen binding arm linked to an Fc sequence capable of conferring in vivo stability to the fragment. In the present disclosure an antibody fragment can comprise the variable light chain (e.g., SEQ ID NO:4 from amino acid 1 to 107), the variable heavy chain (e.g., SEQ ID NO:2 from amino acid 1 to 115) a combination of the variable light region and variable heavy region, domains comprising 1 to 3 of the CDRs from each of the variable heavy regions and variable light regions etc.

An "antigen" is a predetermined substance of part thereof to which an antibody can selectively bind. The target antigen may be polypeptide, carbohydrate, nucleic acid, lipid, hapten or other naturally occurring or synthetic compound. Antigens comprise epitopes that are recognized by antibodies. In a specific embodiment, the disclosure provides for oxidized cholesteryl esters (OxCE) epitopes. OxCE is a type of neo-epitope, which arise during the development of atherosclerosis, the underlying disease manifesting in heart attack or stroke. It was further found herein, that the distribution of OxCE epitopes in plasma lipoproteins is different to that oxidized phospholipid (OxPL) epitopes. As OxCE and OxPL levels in plasma were found not to correlate, OxCE should be considered as a unique and independent epitope.

The term "anti-OxCE antibody" or "an antibody that binds to OxCE" refers to an antibody that is capable of binding OxCE with sufficient affinity such that the antibody is useful as a biomarker for diagnostic applications and/or for use as a therapeutic agent in targeting OxCE.

A "blocking" antibody or an "antagonist" antibody is one which inhibits or reduces biological activity of the antigen it binds. Certain blocking antibodies or antagonist antibodies substantially or completely inhibit the biological activity of the antigen.

"Binding affinity" generally refers to the strength of the sum total of non-covalent interactions between a single binding site of a molecule (e.g., an antibody) and its binding partner (e.g., an antigen). Unless indicated otherwise, as used herein, "binding affinity" refers to intrinsic binding affinity which reflects a 1:1 interaction between members of a binding pair (e.g., antibody and antigen). The affinity of a molecule X for its partner Y can generally be represented by the dissociation constant ($K_d$). Affinity can be measured by common methods known in the art, including those described herein. Low-affinity antibodies generally bind antigen slowly and tend to dissociate readily, whereas high-affinity antibodies generally bind antigen faster and tend to remain bound longer. A variety of methods of measuring binding affinity are known in the art, any of which can be used for purposes of this disclosure.

A "biological sample" encompasses a variety of sample types obtained from an individual and can be used in a diagnostic or monitoring assay. The definition encompasses blood and other liquid samples of biological origin, solid tissue samples such as a biopsy specimen or tissue cultures or cells derived therefrom, and the progeny thereof. The definition also includes samples that have been manipulated after their procurement, such as by treatment with reagents, solubilization, or enrichment for certain components, such as proteins or polynucleotides, or embedding in a semi-solid or solid matrix for sectioning purposes. The term "biological sample" encompasses a clinical sample, and also includes cells in culture, cell supernatants, cell lysates, serum, plasma, biological fluid, and tissue samples. The source of the biological sample may be solid tissue as from a fresh, frozen and/or preserved organ or tissue sample or biopsy or aspirate; blood or any blood constituents; bodily fluids such as cerebral spinal fluid, amniotic fluid, peritoneal fluid, or interstitial fluid; cells from any time in gestation or development of the subject. In some embodiments, the biological sample is obtained from a primary or metastatic tumor. The biological sample may contain compounds which are not naturally intermixed with the tissue in nature such as preservatives, anticoagulants, buffers, fixatives, nutrients, antibiotics, or the like.

A "cardiovascular disease" is a cardiovascular disorder, as defined herein, characterized by clinical events including clinical symptoms and clinical signs. Clinical symptoms are those experiences reported by a patient that indicate to the clinician the presence of pathology. Clinical signs are those objective findings on physical or laboratory examination that indicate to the clinician the presence of pathology. "Cardiovascular disease" includes both "coronary artery disease" and "peripheral vascular disease." Clinical symptoms in cardiovascular disease include chest pain, shortness of breath, weakness, fainting spells, alterations in consciousness, extremity pain, paroxysmal nocturnal dyspnea, transient ischemic attacks and other such phenomena experienced by the patient. Clinical signs in cardiovascular disease include such findings as EKG abnormalities, altered peripheral pulses, arterial bruits, abnormal heart sounds, rales and wheezes, jugular venous distention, neurological alterations and other such findings discerned by the clinician. Clinical symptoms and clinical signs can combine in a cardiovascular disease such as a myocardial infarction (MI) or a stroke (also termed a "cerebrovascular accident" or "CVA"), where the patient will report certain phenomena (symptoms) and the clinician will perceive other phenomena (signs) all indicative of an underlying pathology. "Cardiovascular disease" includes those diseases related to the cardiovascular disorders of fragile plaque disorder, occlusive disorder and stenosis. For example, a cardiovascular disease resulting from a fragile plaque disorder, as that term is defined below, can be termed a "fragile plaque disease." Clinical events associated with fragile plaque disease include those signs and symptoms where the rupture of a fragile plaque with subsequent acute thrombosis or with distal embolization are hallmarks. Examples of fragile plaque disease include certain strokes and myocardial infarctions. As another example, a cardiovascular disease resulting from an occlusive disorder can be termed an "occlusive disease." Clinical events associated with occlusive disease include those signs and symptoms where the progressive occlusion of an artery affects the amount of circulation that reaches a target tissue. Progressive arterial occlusion may result in progressive ischemia that may ultimately progress to tissue death if the amount of circulation is insufficient to maintain the tissues. Signs and symptoms of occlusive disease include claudication, rest pain, angina, and gangrene, as well as physical and laboratory findings indicative of vessel stenosis and decreased distal perfusion. As yet another example, a cardiovascular disease resulting from restenosis can be termed an in-stent stenosis disease. In-stent stenosis disease includes the signs and symptoms resulting from the progressive blockage of an arterial stent that has been positioned as part of a procedure like a percutaneous transluminal angioplasty, where the presence of the stent is intended to help hold the vessel in its newly expanded configuration. The clinical events that accompany in-stent stenosis disease are those attributable to the restenosis of the reconstructed artery.

A "cardiovascular disorder" refers broadly to both coronary artery disorders and peripheral arterial disorders. The term "cardiovascular disorder" can apply to any abnormality of an artery, whether structural, histological, biochemical or any other abnormality. This term includes those disorders characterized by fragile plaque (termed herein "fragile plaque disorders"), those disorders characterized by vaso-occlusion (termed herein "occlusive disorders"), and those disorders characterized by restenosis. A "cardiovascular disorder" can occur in an artery primarily, that is, prior to any medical or surgical intervention. Primary cardiovascular disorders include, among others, atherosclerosis, arterial occlusion, aneurysm formation and thrombosis. A "cardiovascular disorder" can occur in an artery secondarily, that is, following a medical or surgical intervention. Secondary cardiovascular disorders include, among others, post-traumatic aneurysm formation, restenosis, and post-operative graft occlusion.

A "coronary artery disease" ("CAD") refers to a vascular disorder relating to the blockage of arteries serving the heart. Blockage can occur suddenly, by mechanisms such as plaque rupture or embolization. Blockage can occur progressively, with narrowing of the artery via myointimal hyperplasia and plaque formation. Those clinical signs and symptoms resulting from the blockage of arteries serving the heart are manifestations of coronary artery disease. Manifestations of coronary artery disease include angina, ischemia, myocardial infarction, cardiomyopathy, congestive heart failure, arrhythmias and aneurysm formation. It is understood that fragile plaque disease in the coronary circulation is associated with arterial thrombosis or distal embolization that manifests itself as a myocardial infarction. It is understood that occlusive disease in the coronary circulation is associated with arterial stenosis accompanied by anginal symptoms, a condition commonly treated with pharmacological interventions and with angioplasty.

A "disorder", "disease", and "condition" are used interchangeably herein and refers to any condition that can be detected by the methods described herein or that would benefit from treatment with a substance/molecule or method of the disclosure. This includes chronic and acute disorders or diseases including those pathological conditions which predispose the mammal to the disorder in question. Non-limiting examples of disorders to be treated herein include cardiovascular disease and stenosis.

Antibody "effector functions" refer to those biological activities attributable to the Fc region of an antibody, and vary with the antibody isotype. Examples of antibody effector functions include: Clq binding and complement dependent cytotoxicity (CDC); Fc receptor binding; antibody-dependent cell-mediated cytotoxicity (ADCC); phagocytosis; down regulation of cell surface receptors (e.g. B cell receptor); and B cell activation.

The term "Fc region" as used herein refers to the C-terminal region of an immunoglobulin heavy chain, including native sequence Fc regions and variant Fc regions.

A "functional Fc region" possesses an "effector function" of a native sequence Fc region. Such effector functions generally require the Fc region to be combined with a binding to domain (e.g., an antibody variable domain) and can be assessed using various assays as disclosed, for example, in definitions herein.

A "native sequence Fc region" comprises an amino acid sequence that is identical to the amino acid sequence of an Fc region found in nature. Native sequence human Fc regions include a native sequence human IgG1 Fc region (non-A and A allotypes); native sequence human IgG2 Fc region; native sequence human IgG3 Fc region; and native sequence human IgG4 Fc region as well as naturally occurring variants thereof.

"Fc receptor" or "FcR" describes a receptor that binds to the Fc region of an antibody. In some embodiments, an FcR is a native human FcR. In some embodiments, an FcR is one which binds an IgG antibody (a gamma receptor) and includes receptors of the FcγRI, FcγRII, and FcγRIII subclasses, including allelic variants and alternatively spliced forms of those receptors. FcγRII receptors include FcγRIIA (an "activating receptor") and FcγRIIB (an "inhibiting receptor"), which have similar amino acid sequences that differ primarily in the cytoplasmic domains thereof. Activating receptor FcγRIIA contains an immunoreceptor tyrosine-based activation motif (ITAM) in its cytoplasmic domain. Inhibiting receptor FcγRIIB contains an immunoreceptor tyrosine-based inhibition motif (ITIM) in its cytoplasmic domain. (see, e.g., Daeron, Annu. Rev. Immunol. 15:203-234 (1997)). FcRs are reviewed, for example, in Ravetch and Kinet, Annu. Rev. Immunol 9:457-92 (1991); Capel et al., Immunomethods 4:25-34 (1994); and de Haas et al., J. Lab. Clin. Med. 126:330-41 (1995). Other FcRs, including those to be identified in the future, are encompassed by the term "FcR" herein.

Fc receptor also include the neonatal receptor, FcRn, which is responsible for the transfer of maternal IgGs to the fetus (Guyer et al., J. Immunol. 117:587 (1976) and Kim et al., J. Immunol. 24:249 (1994)) and regulation of homeostasis of immunoglobulins. Methods of measuring binding to FcRn are known (see, e.g., Ghetie and Ward., Immunol. Today 18(12):592-598 (1997); Ghetie et al., Nature Biotechnology, 15(7):637-640 (1997); Hinton et al., J. Biol. Chem. 279(8):6213-6216 (2004); WO 2004/92219 (Hinton et al.).

Binding to human FcRn in vivo and serum half-life of human FcRn high affinity binding polypeptides can be assayed, e.g., in transgenic mice or transfected human cell lines expressing human FcRn, or in primates to which the polypeptides with a variant Fc region are administered. WO 2000/42072 (Presta) describes antibody variants with improved or diminished binding to FcRs. See also, e.g., Shields et al. J. Biol. Chem. 9(2):6591-6604 (2001).

"Fv" is the minimum antibody fragment which contains a complete antigen-recognition and -binding site. In a two-chain Fv species, this region consists of a dimer of one heavy- and one light-chain variable domain in tight, non-covalent association (e.g., SEQ ID NO:2 from amino acid 1 to 115 non-covalently linked to SEQ ID NO:4 from amino acid 1 to 107). In a single-chain Fv (scFv) species, one heavy- and one light-chain variable domain can be covalently linked by a flexible peptide linker such that the light and heavy chains can associate in a "dimeric" structure analogous to that in a two-chain Fv species (e.g., a $V_H$ domain such as SEQ ID NO:2 from amino acid 1 to 115 linked by a flexible linker to a $V_L$ domain such as SEQ ID NO:4 from amino acid 1 to 107). It is in this configuration that the three HVRs (i.e., CDRs) of each variable domain interact to define an antigen-binding site on the surface of the $V_H$-$V_L$ dimer. Collectively, the six HVRs (6 CDRs: CDR-H1, -H2, -H3, -L1, -L2, -L3) confer antigen-binding specificity to the antibody. However, even a single variable domain (or half of an Fv comprising only three HVRs (CDRs) specific for an antigen has the ability to recognize and bind antigen, although at a lower affinity than the entire binding site.

Papain digestion of antibodies produces two identical antigen-binding fragments, called "Fab" fragments, each with a single antigen-binding site, and a residual "Fc" fragment, whose name reflects its ability to crystallize readily. Pepsin treatment yields an F(ab')$_2$ fragment that has two antigen-combining sites and is still capable of cross-linking antigen.

A Fab fragment contains the constant domain of the light chain and the first constant domain (CH1) of the heavy chain. Fab' fragments differ from Fab fragments by the addition of a few residues at the carboxy terminus of the heavy chain CH1 domain including one or more cysteines from the antibody hinge region. Fab'-SH is the designation herein for Fab' in which the cysteine residue(s) of the constant domains have a free thiol group. F(ab')$_2$ antibody fragments originally were produced as pairs of Fab' fragments which have hinge cysteines between them. Other chemical couplings of antibody fragments are also known.

"Framework" or "FR" residues are those variable domain residues other than the hypervariable region residues as herein defined. The framework of FR residues can be envisioned as amino acid sequences separating CDR domains from each other.

"Humanized" forms of non-human (e.g., murine) antibodies are chimeric antibodies that contain minimal sequence derived from non-human immunoglobulin. In one embodiment, a humanized antibody is a human immunoglobulin (recipient antibody) in which residues from an HVR (CDR) of the recipient are replaced by residues from an HVR (CDR) of a non-human species (donor antibody) such as mouse, rat, rabbit, or nonhuman primate having the desired specificity, affinity, and/or capacity. In some instances, FR residues of the human immunoglobulin are replaced by corresponding non-human residues. Furthermore, humanized antibodies may comprise residues that are not found in the recipient antibody or in the donor antibody. These modifications may be made to further refine antibody performance. In general, a humanized antibody will comprise substantially all of at least one, and typically two, variable domains, in which all or substantially all of the hypervariable loops (CDRs) correspond to those of a non-human immunoglobulin, and all or substantially all of the FRs are those of a human immunoglobulin sequence. The humanized antibody optionally will also comprise at least a portion of an immunoglobulin constant region (Fc), typically that of a human immunoglobulin. For further details, see, e.g., Jones et al., *Nature* 321:522-525 (1986); Riechmann et al., *Nature* 332:323-329 (1988); and Presta, *Curr. Op. Struct. Biol.* 2:593-596 (1992). See also, e.g., Vaswani and Hamilton, Ann. *Allergy, Asthma & Immunol.* 1:105-115 (1998); Harris, *Biochem. Soc. Transactions* 23:1035-1038 (1995); Hurle and Gross, *Curr. Op. Biotech.* 5:428-433 (1994); and U.S. Pat. Nos. 6,982,321 and 7,087,409.

A "human antibody" is one which possesses an amino acid sequence which corresponds to that of an antibody produced by a human and/or has been made using any of the techniques for making human antibodies. This definition of a human antibody specifically excludes a humanized antibody comprising non-human antigen-binding residues. Human antibodies can be produced using various techniques known in the art, including phage-display libraries. Hoogenboom and Winter, *J. Mol. Biol.*, 227:381 (1991); Marks et al., *J. Mol. Biol.*, 222:581 (1991). Also available for the preparation of human monoclonal antibodies are methods described in Cole et al., Monoclonal Antibodies and Cancer Therapy, Alan R. Liss, p. 77 (1985); Boerner et al., *J. Immunol.*, 147(1):86-95 (1991). See also van Dijk and van de Winkel, *Curr. Opin. Pharmacol.*, 5: 368-74 (2001). Human antibodies can be prepared by administering the antigen to a transgenic animal that has been modified to produce such antibodies in response to antigenic challenge, but whose endogenous loci have been disabled, e.g., immunized xenomice (see, e.g., U.S. Pat. Nos. 6,075,181 and 6,150,584). See also, for example, Li et al., Proc. *Natl. Acad. Sci. USA,* 103:3557-3562 (2006) regarding human antibodies generated via a human B-cell hybridoma technology.

"Human effector cells" are leukocytes which express one or more FcRs and perform effector functions. In certain embodiments, the cells express at least FcγRIII and perform ADCC effector function(s). Examples of human leukocytes which mediate ADCC include peripheral blood mononuclear cells (PBMC), natural killer (NK) cells, monocytes, cytotoxic T cells, and neutrophils. The effector cells may be isolated from a native source, e.g., from blood.

The term "hypervariable region," "HVR," or "HV," (sometimes also referred to as complementarity determining regions (CDRs)) when used herein refers to the regions of an antibody variable domain which are hypervariable in sequence and/or form structurally defined loops. Generally, antibodies comprise six HVRs (CDRs): three in the VH (H1, H2, H3), and three in the VL (L1, L2, L3). In native antibodies, H3 and L3 display the most diversity of the six HVRs, and H3 in particular is believed to play a unique role in conferring fine specificity to antibodies. See, e.g., Xu et al., *Immunity* 13:37-45 (2000); Johnson and Wu, in Methods in *Molecular Biology* 248:1-25 (Lo, ed., Human Press, Totowa, N.J., 2003). Indeed, naturally occurring camelid antibodies consisting of a heavy chain only are functional and stable in the absence of light chain. See, e.g., Hamers-Casterman et al., *Nature* 363:446-448 (1993); Sheriff et al., *Nature Struct. Biol.* 3:733-736 (1996).

An "isolated" antibody is one which has been identified and separated and/or recovered from a component of its natural environment. Contaminant components of its natural environment are materials which would interfere with diagnostic or therapeutic uses for the antibody, and may include enzymes, hormones, and other proteinaceous or nonproteinaceous solutes. In some embodiments, the antibody will be purified (1) to greater than 95% by weight of antibody as determined by the Lowry method, and typically more than 99% by weight, (2) to a degree sufficient to obtain at least 15 residues of N-terminal or internal amino acid sequence by use of a spinning cup sequenator, or (3) to homogeneity by SDS-PAGE under reducing or nonreducing conditions using Coomassie blue or silver stain. An isolated antibody includes the antibody in situ within recombinant cells since at least one component of the antibody's natural environment will not be present. Ordinarily, however, an isolated antibody will be prepared by at least one purification step.

An "isolated" nucleic acid molecule is a nucleic acid molecule that is identified and separated from at least one contaminant nucleic acid molecule with which it is ordinarily associated in the natural source of the antibody nucleic acid. An isolated nucleic acid molecule is other than in the form or setting in which it is found in nature. Isolated nucleic acid molecules therefore are distinguished from the nucleic acid molecule as it exists in natural cells. However, an isolated nucleic acid molecule includes a nucleic acid molecule contained in cells that ordinarily express the antibody where, for example, the nucleic acid molecule is in a chromosomal location different from that of natural cells.

The word "label" when used herein refers to a compound or composition which is conjugated or fused directly or indirectly to a reagent such as a nucleic acid probe or an antibody and facilitates detection of the reagent to which it is conjugated or fused. The label may itself be detectable (e.g., radioisotope labels or fluorescent labels) or, in the case of an enzymatic label, may catalyze chemical alteration of a substrate compound or composition which is detectable.

The "light chains" of antibodies (immunoglobulins) from any vertebrate species can be assigned to one of two clearly distinct types, called kappa (κ) and lambda (λ), based on the amino acid sequences of their constant domains.

The term "monoclonal antibody" as used herein refers to an antibody obtained from a population of substantially homogeneous antibodies, i.e., the individual antibodies comprising the population are identical except for possible mutations, e.g., naturally occurring mutations, that may be present in minor amounts. Thus, the modifier term "monoclonal" indicates the character of the antibody as not being a mixture of discrete antibodies. In certain embodiments, such a monoclonal antibody typically includes an antibody comprising a polypeptide sequence that binds a target, wherein the target-binding polypeptide sequence was obtained by a process that includes the selection of a single target binding polypeptide sequence from a plurality of polypeptide sequences. For example, the selection process can be the selection of a unique clone from a plurality of clones, such as a pool of hybridoma clones, phage clones, or recombinant DNA clones. It should be understood that a selected target binding sequence can be further altered, for example, to improve affinity for the target, to humanize the target binding sequence, to improve its production in cell culture, to reduce its immunogenicity in vivo, to create a multi-specific antibody, etc., and that an antibody comprising the altered target binding sequence is also a monoclonal antibody for purposes of this disclosure. In contrast to polyclonal antibody preparations, which typically include different antibodies directed against different determinants (epitopes), each monoclonal antibody of a monoclonal antibody preparation is directed against a single determinant on an antigen. In addition to their specificity, monoclonal antibody preparations are advantageous in that they are typically uncontaminated by other immunoglobulins.

Monoclonal Ab (mAb) AG23 refers to the particular clone comprising the VH and VL chains set forth in SEQ ID NO:2 and 4, respectively and which are encoded by the polynucleotides of SEQ ID NO:1 and 3, respectively.

The modifier term "monoclonal" indicates the character of the antibody as being obtained from a substantially homogeneous population of antibodies, and is not to be construed as requiring production of the antibody by any particular method. For example, the monoclonal antibodies to be used in accordance with the disclosure may be made by a variety of techniques, including, for example, the hybridoma method (e.g., Kohler and Milstein, *Nature,* 256: 495-97 (1975); Hongo et al., Hybridoma, 14 (3): 253-260 (1995), Harlow et al., Antibodies: A Laboratory Manual, (Cold Spring Harbor Laboratory Press, 2nd ed. 1988); Hammerling et al., in: Monoclonal Antibodies and T-Cell Hybridomas 563-681 (Elsevier, N.Y., 1981)), recombinant DNA methods (see, e.g., U.S. Pat. No. 4,816,567), phage-display technologies (see, e.g., Clackson et al., *Nature,* 352: 624-628 (1991); Marks et al., *J. Mol. Biol.* 222: 581-597 (1992); Sidhu et al., *J. Mol. Biol.* 338(2): 299-310 (2004); Lee et al., *J. Mol. Biol.* 340(5): 1073-1093 (2004); Fellouse, *Proc. Natl. Acad. Sci. USA* 101(34): 12467-12472 (2004); and Lee et al., *J. Immunol. Methods* 284(1-2): 119-132 (2004), and technologies for producing human or human-like antibodies in animals that have parts or all of the human immunoglobulin loci or genes encoding human immunoglobulin sequences (see, e.g., WO 1998/24893; WO 1996/34096; WO 1996/33735; WO 1991/10741; Jakobovits et al., *Proc. Natl. Acad. Sci. USA* 90: 2551 (1993); Jakobovits et al., *Nature* 362: 255-258 (1993); Bruggemann et al., Year in Immunol. 7:33 (1993); U.S. Pat. Nos. 5,545,807; 5,545,806; 5,569,825; 5,625,126; 5,633,425; and 5,661,016; Marks et al., *Bio/Technology* 10: 779-783 (1992); Lonberg et al., *Nature* 368: 856-859 (1994); Morrison, *Nature* 368: 812-813 (1994); Fishwild et al., *Nature Biotechnol.* 14: 845-851 (1996); Neuberger, *Nature Biotechnol.* 14: 826 (1996); and Lonberg and Huszar, *Intern. Rev. Immunol.* 13: 65-93 (1995).

The monoclonal antibodies herein specifically include "chimeric" antibodies in which a portion of the heavy and/or light chain is identical with or homologous to corresponding sequences in antibodies derived from a particular species or belonging to a particular antibody class or subclass, while the remainder of the chain(s) is identical with or homologous to corresponding sequences in antibodies derived from another species or belonging to another antibody class or subclass, as well as fragments of such antibodies, so long as they exhibit the desired biological activity (see, e.g., U.S. Pat. No. 4,816,567; and Morrison et al., *Proc. Natl. Acad. Sci. USA* 81:6851-6855 (1984)). Chimeric antibodies include antibodies wherein the antigen-binding region of the antibody is derived from an antibody produced by, e.g., immunizing macaque monkeys with the antigen of interest.

"Oligonucleotide," as used herein, refers to short, typically single stranded polynucleotides that are generally, but not necessarily, less than about 200 nucleotides in length. The terms "oligonucleotide" and "polynucleotide" are not mutually exclusive. The description above for polynucleotides is equally and fully applicable to oligonucleotides.

"Oxidized cholesteryl esters (OxCE)" belongs to the family of oxidation-specific epitopes (OSE). Oxidized cholesteryl esters (OxCE) are damage-associated molecular patterns (DAMPs) arising during the development of atherosclerosis. OxCEs are found in human plasma and atherosclerotic tissue. For example, cholesteryl arachidonate and cholesteryl linoleate oxidation products were detected in human plasma from CVD patients and in human atherosclerotic lesions 9), as well as in experimental studies with hypercholesterolemic mice and zebrafish. Human atherosclerotic lesions contain OxCE not only in a free lipid form, but also as covalent adducts to proteins. The distinguishing properties of OxCE is in its unique biological activity via TLR4-mediated proinflammatory signaling (see Choi et al., *PLoS One* 8: e83145 (2013)); Miller et al., *Trends Endocrinol Metab* 28: 143-152 (2017)); and Choi et al., *Biochim Biophys Acta* 1862: 393-397 (2017)). As shown herein, the distribution of OxCE epitopes in plasma lipoproteins is different to that of oxidized phospholipid (OxPL). Moreover, as OxCE and OxPL levels in plasma do not correlate, OxCE is an independent biomarker.

Oxidized phospholipids (OxPL) refer to phospholipids with a phosphocholine (PC) headgroup. OxPL are highly pro-inflammatory and proatherogenic. Phosphorylcholine, a polar head group on certain phospholipids, has been extensively implicated in cardiovascular disease. Reactive oxygen species generated during coronary inflammation causes the oxidation of low-density lipoprotein (LDL) to generate oxidized LDL (oxLDL). In fact, cardiovascular diseases (CVD) such as atherosclerosis, unstable angina, or acute coronary syndrome have been shown to be associated with elevated plasma levels of oxLDL (Itabe and Ueda. 2007). LDL is a circulating lipoprotein particle that contains lipids with a PC polar head group and proteins, an apoB100 protein. Antibodies towards phosphorylcholine (PC) have been shown to bind oxidized, or otherwise modified, LDL and block the pro-inflammatory activity of oxLDL in in vivo models or in vitro studies (Shaw et al. 2000; Shaw et al. 2001).

"PAD" or "peripheral artery disease" encompasses disease states such as atherosclerosis and atherothrombosis that occur outside the heart and brain. It is a common comorbid disease with CAD. Subjects who are deemed to be at low risk or no risk of PAD based upon an assessment of traditional risk factors of PAD (or arteriovascular disease), or who are asymptomatic for PAD or an arteriovascular disease may nevertheless be at risk for an arteriovascular event, even in the absence of claudication. Claudication can be defined as pain or discomfort in the muscles of the legs occurring due to a decreased amount of blood flowing to a muscle from narrowing of the peripheral arteries, producing ischemia and often arterial occlusion, causing skeletal muscle and limb necrosis. The pain or discomfort often occurs when walking and dissipates under resting conditions (intermittent claudication). Pain, tightness, cramping, tiredness or weakness is often experienced as a result of claudication. PAD not only causes the hemodynamic alterations common in CAD, but also results in metabolic changes in skeletal muscle. When PAD has progressed to severe chronic and acute peripheral arterial occlusion, surgery and limb amputation often become the sole therapeutic options.

PAD is widely considered to be an underdiagnosed disease, with the majority of confirmed diagnoses occurring only after symptoms are manifested, or only with other arteriovascular disease, and irreversible arteriovascular damage due to such ischemic events has already occurred.

A "polynucleotide," or "nucleic acid," as used herein, refer to polymers of nucleotides of any length, and include DNA and RNA. The nucleotides can be deoxyribonucleotides, ribonucleotides, modified nucleotides or bases, and/or their analogs that can be incorporated into a polymer by DNA or RNA polymerase, or by a synthetic reaction. A polynucleotide may comprise modified nucleotides, such as methylated nucleotides and their analogs. If present, modification to the nucleotide structure may be imparted before or after assembly of the polymer. A polynucleotide may be further modified after synthesis, such as by conjugation with a label. Other types of modifications include, for example, "caps", substitution of one or more of the naturally occurring nucleotides with an analog, internucleotide modifications such as, for example, those with uncharged linkages (e.g., methyl phosphonates, phosphotriesters, phosphoamidates, carbamates, etc.) and with charged linkages (e.g., phosphorothioates, phosphorodithioates, etc.), those containing pendant moieties, such as, for example, proteins (e.g., nucleases, toxins, antibodies, signal peptides, poly-L-lysine, etc.), those with intercalators (e.g., acridine, psoralen, etc.), those containing chelators (e.g., metals, radioactive metals, boron, oxidative metals, etc.), those containing alkylators, those with modified linkages (e.g., alpha anomeric nucleic acids, etc.), as well as unmodified forms of the polynucleotide(s). Further, any of the hydroxyl groups ordinarily present in the sugars may be replaced, for example, by phosphonate groups, phosphate groups, protected by standard protecting groups, or activated to prepare additional linkages to additional nucleotides, or may be conjugated to solid or semi-solid supports. The 5' and 3' terminal OH can be phosphorylated or substituted with amines or organic capping group moieties of from 1 to 20 carbon atoms. Other hydroxyls may also be derivatized to standard protecting groups. Polynucleotides can also contain analogous forms of ribose or deoxyribose sugars that are generally known in the art, including, for example, 2'-O-methyl-, 2'-O-allyl, 2'-fluoro- or 2'-azido-ribose, carbocyclic sugar analogs, alpha-anomeric sugars, epimeric sugars such as arabinose, xyloses or lyxoses, pyranose sugars, furanose sugars, sedoheptuloses, acyclic analogs and a basic nucleoside analog such as methyl riboside. One or more phosphodiester linkages may be replaced by alternative linking groups. These alternative linking groups include, but are not limited to, embodiments wherein phosphate is replaced by P(O)S ("thioate"), P(S)S ("dithioate"), "(O)NR$_2$ ("amidate"), P(O)R, P(O)OR', CO or CH$_2$ ("formacetal"), in which each R or R' is independently H or substituted or unsubstituted alkyl (1-20 C) optionally containing an ether (—O—) linkage, aryl, alkenyl, cycloalkyl, cycloalkenyl or araldyl. Not all linkages in a polynucleotide need be identical. The preceding description applies to all polynucleotides referred to herein, including RNA and DNA.

"Single-chain Fv" or "scFv" antibody fragments comprise the V$_H$ and V$_L$ domains of antibody, wherein these domains are present in a single polypeptide chain. Generally, the scFv polypeptide further comprises a polypeptide linker between the V$_H$ and V$_L$ domains which enables the scFv to form the desired structure for antigen binding. For a review of scFv see Pluckthun, The Pharmacology of Monoclonal Antibodies, vol. 113, Rosenburg and Moore eds., Springer-Verlag, New York, pp. 269-315 (1994).

The term "substantially similar" or "substantially the same," as used herein, denotes a sufficiently high degree of similarity between two numeric values (for example, one associated with an antibody of the disclosure and the other associated with a reference/comparator antibody), such that one of skill in the art would consider the difference between the two values to be of little or no biological and/or statistical significance within the context of the biological characteristic measured by the values (e.g., K$_d$ values). The difference between said two values is, for example, less than about 50%, less than about 40%, less than about 30%, less than about 20%, and/or less than about 10% as a function of the reference/comparator value.

The phrase "substantially increased", "substantially reduced," or "substantially different," as used herein, denotes a sufficiently high degree of difference between two numeric values (generally one associated with a molecule and the other associated with a reference/comparator molecule) such that one of skill in the art would consider the difference between the two values to be of statistical significance within the context of the biological characteristic measured by said values (e.g., K$_d$ values). The difference between said two values is, for example, greater than about 10%, greater than about 20%, greater than about 30%, greater than about 40%, and/or greater than about 50% as a function of the value for the reference/comparator molecule.

The term "variable" refers to the fact that certain portions of the variable domains differ extensively in sequence among antibodies and are used in the binding and specificity of each particular antibody for its particular antigen. However, the variability is not evenly distributed throughout the variable domains of antibodies. It is concentrated in three segments called complementarity-determining regions or hypervariable regions (CDRs or HVRs, used interchangeably herein) both in the light-chain and the heavy-chain variable domains. The more highly conserved portions of variable domains are called the framework (FR). The variable domains of native heavy and light chains each comprise four FR regions, largely adopting a β-sheet configuration, connected by three HVRs (CDRs), which form loops connecting, and in some cases forming part of, the β-sheet structure. The HVRs (CDRs) in each chain are held together in close proximity by the FR regions and, with the HVRs (CDRs) from the other chain, contribute to the formation of the antigen-binding site of antibodies (see Kabat et al., Sequences of Proteins of Immunological Interest, Fifth Edition, National Institute of Health, Bethesda, Md. (1991)). The constant domains are not involved directly in binding an antibody to an antigen, but exhibit various effector functions, such as participation of the antibody in antibody-dependent cellular toxicity.

The term "vector," as used herein, is intended to refer to a nucleic acid molecule capable of transporting another nucleic acid to which it has been linked. One type of vector is a "plasmid", which refers to a circular double stranded DNA loop into which additional DNA segments may be ligated. Another type of vector is a phage vector. Another type of vector is a viral vector, wherein additional DNA segments may be ligated into the viral genome. Certain vectors are capable of autonomous replication in a host cell into which they are introduced (e.g., bacterial vectors having a bacterial origin of replication and episomal mammalian vectors). Other vectors (e.g., non-episomal mammalian vectors) can be integrated into the genome of a host cell upon introduction into the host cell and replicate along with the host genome. Moreover, certain vectors are capable of directing the expression of genes to which they are operatively linked. Such vectors are referred to herein as "expression vectors". In general, expression vectors of utility in recombinant DNA techniques are often in the form of plasmids.

The term "diabodies" refers to small antibody fragments with two antigen-binding sites, which fragments comprise a heavy-chain variable domain ($V_H$) connected to a light-chain variable domain ($V_L$) in the same polypeptide chain ($V_H$—$V_L$). By using a linker that is too short to allow pairing between the two domains on the same chain, the domains are forced to pair with the complementary domains of another chain and create two antigen-binding sites. Diabodies are described more fully in, for example, EP 404,097; WO 93/11161; and Hollinger et al., Proc. Natl. Acad. Sci. USA, 90:6444-6448 (1993). Triabodies and tetrabodies are also described in Hudson et al., Nat. Med. 9:129-134 (2003).

A "variant Fc region" comprises an amino acid sequence which differs from that of a native sequence Fc region by virtue of at least one amino acid modification, typically one or more amino acid substitution(s). Typically, the variant Fc region has at least one amino acid substitution compared to a native sequence Fc region or to the Fc region of a parent polypeptide, e.g. from about one to about ten amino acid substitutions, and typically from about one to about five amino acid substitutions in a native sequence Fc region or in the Fc region of the parent polypeptide. The variant Fc region of a disclosure possesses at least about 80% homology with a native sequence Fc region and/or with an Fc region of a parent polypeptide, at least about 90% homology therewith, and typically at least about 95% homology therewith.

Lipid oxidation collectively yields a large variety of oxidation-specific epitopes (OSE), such as oxidized phospholipids (OxPL) and malondialdehyde (MDA) epitopes. OSE are immunogenic, pro-inflammatory, pro-atherogenic and plaque destabilizing and represent danger associated molecular patterns (DAMPs). DAMPs are recognized by the innate immune system via pattern recognition receptors, including scavenger receptors IgM natural antibodies and complement factor H (CFH), that bind, neutralize and/or facilitate their clearance. Biomarker assays measuring OxPL present on apolipoprotein B-100 lipoproteins, and particularly on lipoprotein (a), predict the development of CVD events. In contrast, OxPL on plasminogen facilitate fibrinolysis and may reduce atherothrombosis. Oxidation-specific antibodies (OSA) attached to magnetic nanoparticles image lipid-rich, oxidation-rich plaques. Infusion or overexpression of OSA reduces the progression of atherosclerosis, suggesting that they may be used in similar applications in humans.

Oxidized cholesteryl esters (OxCE) are the DAMPs arising during the development of atherosclerosis. It has been demonstrated that cholesterol binds to MD-2, a ligand-binding co-receptor for the prototypic PRR, toll-like receptor-4 (TLR4). MD-2 has a hydrophobic pocket and, remarkably, shares a significant structural homology with Niemann-Pick disease type C2, a lysosomal cholesterol-binding protein. Further, cholesterol esterified to an oxidized polyunsaturated fatty acyl chain, i.e., OxCE, when bound to TLR4/MD-2, induces TLR4 dimerization and activates inflammatory responses in macrophages. Importantly, specific OxCE molecules first identified in test-tube oxidation reactions are also found in cellular systems, in vascular lesions of experimental animals and in plasma and atherosclerotic plaques isolated from human CVD patients. For example, cholesteryl arachidonate and cholesteryl linoleate oxidation products were detected in human plasma from CVD patients and in human atherosclerotic lesions, as well as in experimental studies with hypercholesterolemic mice and zebrafish. Human atherosclerotic lesions contain OxCE not only in a free lipid form, but also as covalent adducts to proteins. Based on these findings, it is suggested that OxCE is a major DAMP arising in hypercholesterolemic animals and human subjects, which contributes to vascular inflammation and atherogenesis.

The disclosure demonstrates that immunological detection of OxCE epitopes in plasma have diagnostic value and serve as a new biomarker. The disclosure demonstrates this using a monoclonal Ab (mAb) AG23 that recognizes OxCE covalent adducts irrespective of the modified protein. AG23 specifically stained atherosclerotic lesions in human carotid endarterectomy specimens. AG23 was used in conjunction with Abs targeting apoAI or apoB-100 to measure OxCE associated with apoAI- or apoB-100-containing lipoproteins in human plasma. For example, the methods and compositions of the disclosure demonstrated that, in a cohort of subjects treated with atorvastatin, there was a significant reduction in OxCE-containing apoAI lipoproteins, not associated with changes in apoAI levels.

The disclosure provides antibodies, antibody fragments and humanized antibodies that bind to OxCEs. Antibody fragments may be generated by traditional means, such as enzymatic digestion, or by recombinant techniques. In certain circumstances there are advantages of using antibody fragments, rather than whole antibodies. The smaller size of the fragments allows for rapid clearance, and may lead to improved access to tumors, plaques and diseased tissue. For a review of certain antibody fragments, see Hudson et al. (2003) Nat. Med. 9:129-134.

Various techniques have been developed for the production of antibody fragments. Traditionally, these fragments were derived via proteolytic digestion of intact antibodies (see, e.g., Morimoto et al., Journal of Biochemical and Biophysical Methods 24:107-117 (1992); and Brennan et al., Science, 229:81 (1985)). However, these fragments can now be produced directly by recombinant host cells. Fab, Fv and ScFv antibody fragments can all be expressed in and secreted from E. Coli, thus allowing the facile production of large amounts of these fragments. Antibody fragments can be isolated from the antibody phage libraries. Alternatively, Fab'-SH fragments can be directly recovered from E. Coli and chemically coupled to form F(ab')$_2$ fragments (Carter et al., Bio/Technology 10:163-167 (1992)). According to another approach, F(ab')$_2$ fragments can be isolated directly from recombinant host cell culture. Fab and F(ab')$_2$ fragment with increased in vivo half-life comprising salvage receptor binding epitope residues are described in U.S. Pat. No. 5,869,046. Other techniques for the production of antibody fragments will be apparent to the skilled practitioner. In certain embodiments, an antibody is a single chain Fv fragment (scFv); See WO 93/16185; U.S. Pat. Nos. 5,571,894; and 5,587,458. Fv and scFv are the only species with intact combining sites that are devoid of constant regions; thus, they may be suitable for reduced nonspecific binding during in vivo use. scFv fusion proteins may be constructed to yield fusion of an effector protein at either the amino or the carboxy terminus of an scFv; See Antibody Engineering, ed. Borrebaeck. The antibody fragment may also be a "linear antibody", e.g., as described in U.S. Pat. No. 5,641,870, for example. Such linear antibodies may be monospecific or bispecific.

The disclosure, although providing specific antibody sequences and antibody sequence fragments having biological activity, further disclose that these sequences can be used to generate improved variants. Accordingly, in some instances an antibody or antibody fragment may have a percent identity to the sequences of the disclosure.

In some embodiments, amino acid sequence modification(s) of the antibodies described herein are contemplated. For example, it may be desirable to improve the binding affinity and/or other biological properties of the antibody. Amino acid sequence variants of the antibody may be prepared by introducing appropriate changes into the nucleotide sequence (e.g., SEQ ID NO:1 and 3) encoding the antibody, or by peptide synthesis (e.g., modifications of the sequences set forth in SEQ ID NO:2 and SEQ ID NO:4 or fragments thereof). Such modifications include, for example, deletions from, and/or insertions into and/or substitutions of, residues within the amino acid sequences of the antibody. Any combination of deletion, insertion, and substitution can be made to arrive at the final construct, provided that the final construct possesses the desired characteristics. The amino acid alterations may be introduced in the subject antibody amino acid sequence at the time that sequence is made.

A useful method for identification of certain residues or regions of the antibody that are preferred locations for mutagenesis is called "alanine scanning mutagenesis" as described by Cunningham and Wells (1989) *Science*, 244: 1081-1085. Here, a residue or group of target residues are identified (e.g., charged residues such as Arg, Asp, His, Lys, and Glu) and replaced by a neutral or negatively charged amino acid (e.g., Alanine or Polyalanine) to affect the interaction of the amino acids with antigen. Those amino acid locations demonstrating functional sensitivity to the substitutions then are refined by introducing further or other variants at, or for, the sites of substitution. Thus, while the site for introducing an amino acid sequence variation is predetermined, the nature of the mutation per se need not be predetermined. For example, to analyze the performance of a mutation at a given site, Ala scanning or random mutagenesis is conducted at the target codon or region and the expressed immunoglobulins are screened for the desired activity.

Amino acid sequence insertions include amino- and/or carboxyl-terminal fusions ranging in length from one residue to polypeptides containing a hundred or more residues, as well as intrasequence insertions of single or multiple amino acid residues. Examples of terminal insertions include an antibody with an N-terminal methionyl residue. Other insertional variants of the antibody molecule include the fusion to the N- or C-terminus of the antibody to an enzyme (e.g., for ADEPT) or a polypeptide which increases the serum half-life of the antibody. Polyhistidine tags are also useful for purification.

In certain embodiments, an antibody of the disclosure is altered to increase or decrease the extent to which the antibody is glycosylated. Glycosylation of polypeptides is typically either N-linked or O-linked. N-linked refers to the attachment of a carbohydrate moiety to the side chain of an asparagine residue. The tripeptide sequences asparagine-X-serine and asparagine-X-threonine, where X is any amino acid except proline, are the recognition sequences for enzymatic attachment of the carbohydrate moiety to the asparagine side chain. Thus, the presence of either of these tripeptide sequences in a polypeptide creates a potential glycosylation site. O-linked glycosylation refers to the attachment of one of the sugars N-acetylgalactosamine, galactose, or xylose to a hydroxyamino acid, most commonly serine or threonine, although 5-hydroxyproline or 5-hydroxylysine may also be used.

Addition or deletion of glycosylation sites to the antibody is conveniently accomplished by altering the amino acid sequence such that one or more of the above-described tripeptide sequences (for N-linked glycosylation sites) is created or removed. The alteration may also be made by the addition, deletion, or substitution of one or more serine or threonine residues to the sequence of the original antibody (for O-linked glycosylation sites).

Where the antibody comprises an Fc region, the carbohydrate attached thereto may be altered. Native antibodies produced by mammalian cells typically comprise a branched, biantennary oligosaccharide that is generally attached by an N-linkage to Asn of the $CH_2$ domain of the Fc region. See, e.g., Wright et al. (1997) *TIBTECH* 15:26-32. The oligosaccharide may include various carbohydrates, e.g., mannose, N-acetyl glucosamine (GlcNAc), galactose, and sialic acid, as well as a fucose attached to a GlcNAc in the "stem" of the biantennary oligosaccharide structure. In some embodiments, modifications of the oligosaccharide in an antibody of the invention may be made in order to create antibody variants with certain improved properties.

For example, antibody variants are provided having a carbohydrate structure that lacks fucose attached (directly or indirectly) to an Fc region. Such variants may have improved ADCC function. See, e.g., US Patent Publication Nos. US 2003/0157108 (Presta, L.); US 2004/0093621 (Kyowa Hakko Kogyo Co., Ltd). Examples of publications related to "defucosylated" or "fucose-deficient" antibody variants include: US 2003/0157108; WO 2000/61739; WO 2001/29246; US 2003/0115614; US 2002/0164328; US 2004/0093621; US 2004/0132140; US 2004/0110704; US 2004/0110282; US 2004/0109865; WO 2003/085119; WO 2003/084570; WO 2005/035586; WO 2005/035778; WO2005/053742; WO2002/031140; Okazaki et al. *J. Mol. Biol.* 336:1239-1249 (2004); Yamane-Ohnuki et al. *Biotech. Bioeng.* 87: 614 (2004). Examples of cell lines capable of producing defucosylated antibodies include Lec13 CHO cells deficient in protein fucosylation (Ripka et al., *Arch. Biochem. Biophys.* 249:533-545 (1986); US Pat Appl No US 2003/0157108 A1, Presta, L; and WO 2004/056312 A1, Adams et al.), and knockout cell lines, such as alpha-1,6-fucosyltransferase gene, FUT8, knockout CHO cells (see, e.g., Yamane-Ohnuki et al., *Biotech. Bioeng.* 87: 614 (2004); Kanda, Y. et al., *Biotechnol. Bioeng.*, 94(4):680-688 (2006); and WO2003/085107).

Antibodies variants are further provided with bisected oligosaccharides, e.g., in which a biantennary oligosaccharide attached to the Fc region of the antibody is bisected by GlcNAc. Such antibody variants may have reduced fucosylation and/or improved ADCC function. Examples of such antibody variants are described, e.g., in WO 2003/011878 (Jean-Mairet et al.); U.S. Pat. No. 6,602,684 (Umana et al.); and US 2005/0123546 (Umana et al.). Antibody variants with at least one galactose residue in the oligosaccharide attached to the Fc region are also provided. Such antibody variants may have improved CDC function. Such antibody variants are described, e.g., in WO 1997/30087 (Patel et al.); WO 1998/58964 (Raju, S.); and WO 1999/22764 (Raju, S.).

In certain embodiments, an antibody variant comprises an Fc region with one or more amino acid substitutions which further improve ADCC. Such substitutions may occur in combination with any of the variations described above.

In certain embodiments, the disclosure contemplates an antibody variant that possesses some but not all effector functions, which make it a desirable candidate for many applications in which the half-life of the antibody in vivo is important yet certain effector functions (such as complement and ADCC) are unnecessary or deleterious. In certain embodiments, the Fc activities of the antibody are measured to ensure that only the desired properties are maintained. In vitro and/or in vivo cytotoxicity assays can be conducted to confirm the reduction/depletion of CDC and/or ADCC activities. For example, Fc receptor (FcR) binding assays can be conducted to ensure that the antibody lacks a particular binding but retains other binding. Non-limiting examples of in vitro assays to assess ADCC activity of a molecule of interest is described in U.S. Pat. No. 5,500,362 (see, e.g. Hellstrom et al., *Proc. Nat'l Acad. Sci. USA* 83:7059-7063 (1986)) and Hellstrom I et al., *Proc. Nat'l Acad. Sci. USA* 82:1499-1502 (1985); U.S. Pat. No. 5,821, 337 (see Bruggemann et al., *J. Exp. Med.* 166:1351-1361 (1987)). Alternatively, non-radioactive assays methods may be employed. Useful effector cells for such assays include peripheral blood mononuclear cells (PBMC) and Natural Killer (NK) cells.

Alternatively, or additionally, ADCC activity of the molecule of interest may be assessed in vivo, e.g., in an animal model such as that disclosed in Clynes et al., *Proc. Nat'l Acad. Sci. USA* 95:652-656 (1998). C1q binding assays may also be carried out to confirm that the antibody is unable to bind C1q and hence lacks CDC activity. To assess complement activation, a CDC assay may be performed (see, for example, Gazzano-Santoro et al., *J. Immunol. Methods* 202:163 (1996); Cragg, M. S. et al., *Blood* 101:1045-1052 (2003); and Cragg, M. S. and M. J. Glennie, *Blood* 103: 2738-2743 (2004)). FcRn binding and in vivo clearance/half-life determinations can also be performed using methods known in the art (see, for example, Petkova et al., *Int'l. Immunol.* 18(12):1759-1769 (2006)).

Other antibody variants having one or more amino acid substitutions are provided. Sites of interest for substitutional mutagenesis include the hypervariable regions (CDRs), but FR alterations are also contemplated. Conservative substitutions can also be performed. Amino acid substitutions may be introduced into an antibody of interest and the products screened, e.g., for a desired activity, such as improved antigen binding (e.g., binding to OxCE epitopes), decreased immunogenicity, improved ADCC or CDC, etc.

The disclosure also provides for single chain variable antibody fragments ("scFv"), $V_H$, VL and complementarity determining regions that selectively bind to OxCEs. The scFvs of the disclosure are soluble and can be readily synthesized. Further, vectors comprising sequences encoding the scFvs disclosed herein enabled the production of a transgenic animal model.

The disclosure provides an antibody or antibody fragment capable of binding to OxCEs, wherein the antibody or antibody fragment comprises a variable heavy chain ($V_H$) domain and/or a variable light chain ($V_L$) domain, and wherein (a) the $V_H$ domain comprises an amino acid sequence that includes one, two or three complementarity determining regions (CDRs) and (b) the $V_L$ domain comprises an amino acid sequence that includes one, two or three complementarity determining regions (CDRs). In one embodiment the isolated antibody or antibody fragment comprises a variable heavy chain ($V_H$) corresponding to amino acids 1 to 115 of SEQ ID NO:2. In a further embodiment, an antibody fragment of the disclosure can have heavy chain complementarity determining regions (CDRs) comprising amino acids 26 to 30 of SEQ ID NO:2 (CDR-H1), amino acids 51 to 58 of SEQ ID NO:2 (CDR-H2) and amino acids 96 to 106 of SEQ ID NO:2 (CDR-H3), wherein CDR-H1, -H2 and -H3 are separated by one another by framework sequences. In a further embodiment, the $V_H$ domain can be linked to a heavy chain constant region ($C_H$). The $C_H$ can be from various organisms. For example, in one embodiment, the $C_H$ is murine and comprises amino acids 116 to 440 of SEQ ID NO:2 corresponding to IgG1 Fc of *Mus musculus*. In one embodiment the isolated antibody or antibody fragment comprises a variable light chain ($V_L$) corresponding to amino acids 1 to 107 of SEQ ID NO:4. In a further embodiment, an antibody fragment of the disclosure can have light chain complementarity determining regions (CDRs) comprising amino acids 27 to 31 of SEQ ID NO:4 (CDR-L1), amino acids 49 to 51 of SEQ ID NO:4 (CDR-L2) and amino acids 87 to 97 of SEQ ID NO:4 (CDR-L3), wherein CDR-L1, -L2 and -L3 are separated by one another by framework sequences. In a further embodiment, the $V_L$ can be linked to a light chain constant region ($C_L$). The $C_L$ can be from various organisms. For example, in one embodiment, the $C_L$ is murine and comprises amino acids 108 to 213 of SEQ ID NO:4 corresponding to kappa light-chain constant region of *Mus musculus*. In yet another embodiment, an isolated antibody or antibody fragment of the disclosure recognizes and binds to an oxidized cholesteryl ester (OxCE) epitope, wherein the antibody or antibody fragment comprises a variable heavy chain ($V_H$) domain and/or a variable light chain ($V_L$) domain; wherein the $V_L$ domain comprises a sequence that (i) contains complementarity determining regions (CDRs) of SEQ ID NO:4 from amino acid 24 to 33 (CDR-L1), amino acid 49 to 55 (CDR-L2), and amino acids 88 to 96 (CDR-L3); (ii) has at least 75%, 80%, 85%, 90%, 95%, 98%, 99% or 100% sequence identity to the sequence of SEQ ID NO:4 (from amino acid 1 to 107) or (iii) 75%, 80%, 85%, 90%, 95%, 98%, 99% or 100% sequence identity to SEQ ID NO:4; and wherein the $V_H$ domain comprises a sequence that (i) contains complementarity determining regions (CDRs) of SEQ ID NO:2 from amino acid 26 to 35 (CDR-H1), amino acid 50 to 66 (CDR-H2), and amino acids 99 to 105 (CDR-H3); (ii) has at least 75%, 80%, 85%, 90%, 95%, 98%, 99% or 100% sequence identity to the sequence of SEQ ID NO:2 (from amino acid 1 to 115) or (iii) 75%, 80%, 85%, 90%, 95%, 98%, 99% or 100% sequence identity to SEQ ID NO:2. In another or further embodiment, the VH domain comprises the sequence of SEQ ID NO:2 with 1 to 15 conservative amino acid substitutions. In another or further embodiment, the $V_H$ domain comprises the sequence of SEQ ID NO:2. In another or further embodiment, the $V_L$ domain comprises the sequence of SEQ ID NO:4, but with 1 to 15 conservative amino acid substitutions in the sequence. In another or further embodiment, the $V_L$ domain comprises the sequence of SEQ ID NO:4.

In one embodiment, the disclosure provides an antibody comprising a light-chain variable region encoded by a nucleic acid sequence of SEQ ID NO:3. In another embodiment, the disclosure provides an antibody with a humanized light chain variable region. In another embodiment, the disclosure provides an antibody that comprises a heavy chain variable region comprising a sequence encoded by a nucleic acid of SEQ ID NO:1. In another embodiment, the disclosure provides an antibody that comprises a humanized heavy chain variable region.

In another embodiment, the disclosure provides a chimeric antibody comprising, for example, a $V_H$ and/or $V_L$ and a human Fc region.

In one embodiment, the disclosure provides an scFv comprising a linker between the light chain variable region and the heavy-chain variable region. The linker can be any number of commonly used peptide linkers. In one embodiment, the linker comprises a repeating unit of GGGS. The repeat of GGGS may be 2, 3, 4 or more times. For example, in one embodiment, a $V_H$ domain comprising SEQ ID NO:2 from about amino acid 1 to about amino acid 115 is linked to a $V_L$ domain comprising SEQ ID NO:4 from about amino acid 1 to about amino acid 107, wherein the domains are linked by a linker comprising a repeating unit of GGGS.

In a further embodiment, the disclosure provides for an scFv that has a polypeptide sequence that has at least 75%, at least 80%, at least 85%, at least 90%, at least 95%, at least 98%, or at least 99% sequence identity to the sequences set forth in SEQ ID NO:2 from about amino acid 1 to about amino acid 115 and SEQ ID NO:4 from about amino acid 1 to about amino acid 107 and which selectively binds to an OxCE.

Nucleic acid molecules encoding the amino acid sequences of the antibodies, antibody fragments and variants of the antibody are prepared by a variety of methods known in the art. For preparing variants such methods include, but are not limited to, isolation from a natural source (in the case of naturally occurring amino acid sequence variants) or preparation by oligonucleotide-mediated (or site-directed) mutagenesis, PCR mutagenesis, and cassette mutagenesis of an earlier prepared variant or a non-variant version of the antibody.

The disclosure also encompasses humanized antibodies. Various methods for humanizing non-human antibodies are known in the art. For example, a humanized antibody can have one or more amino acid residues introduced into it from a source which is non-human. These non-human amino acid residues are often referred to as "import" residues, which are typically taken from an "import" variable domain. Humanization can be essentially performed following the method of Winter and co-workers (Jones et al. (1986) *Nature* 321:522-525; Riechmann et al. (1988) *Nature* 332:323-327; Verhoeyen et al. (1988) *Science* 239:1534-1536), by substituting hypervariable region sequences (CDRs) for the corresponding sequences of a human antibody. Accordingly, such "humanized" antibodies are chimeric antibodies (U.S. Pat. No. 4,816,567) wherein substantially less than an intact human variable domain has been substituted by the corresponding sequence from a non-human species. In practice, humanized antibodies are typically human antibodies in which some hypervariable region residues and possibly some FR residues are substituted by residues from analogous sites in rodent antibodies.

The choice of human variable domains, both light and heavy, to be used in making the humanized antibodies can be important to reduce antigenicity. According to the so-called "best-fit" method, the sequence of the variable domain of a rodent antibody is screened against the entire library of known human variable-domain sequences. The human sequence which is closest to that of the rodent is then accepted as the human framework for the humanized antibody. See, e.g., Sims et al. (1993) *J. Immunol.* 151:2296; Chothia et al. (1987) *J. Mol. Biol.* 196:901. Another method uses a particular framework derived from the consensus sequence of all human antibodies of a particular subgroup of light or heavy chains. The same framework may be used for several different humanized antibodies. See, e.g., Carter et al. (1992) *Proc. Natl. Acad. Sci. USA*, 89:4285; Presta et al. (1993) *J. Immunol.*, 151:2623.

It is further generally desirable that antibodies be humanized with retention of high affinity for the antigen and other favorable biological properties. To achieve this goal, according to one method, humanized antibodies are prepared by a process of analysis of the parental sequences and various conceptual humanized products using three-dimensional models of the parental and humanized sequences. Three-dimensional immunoglobulin models are commonly available and are familiar to those skilled in the art. Computer programs are available which illustrate and display probable three-dimensional conformational structures of selected candidate immunoglobulin sequences. Inspection of these displays permits analysis of the likely role of the residues in the functioning of the candidate immunoglobulin sequence, i.e., the analysis of residues that influence the ability of the candidate immunoglobulin to bind its antigen. In this way, FR residues can be selected and combined from the recipient and import sequences so that the desired antibody characteristic, such as increased affinity for the target antigen(s), is achieved. In general, the hypervariable region residues are directly and most substantially involved in influencing antigen binding.

FIG. 9A-B provide the nucleic acid and polypeptide sequences of the VH and VL domains of the AG23 antibody of the disclosure with bold and italicized or underlining identifying hypervariable (CDR) regions useful in developing humanized antibodies.

The disclosure further provides for a scFv disclosed herein that further comprises a fragment crystallizable region ("Fc") of an antibody. In a particular embodiment, the Fc region is from a human or humanized antibody. The Fc region is the tail region of an antibody that interacts with cell surface receptors called Fc receptors and some proteins of the complement system. This property allows antibodies to activate the immune system. In IgG, IgA and IgD antibody isotypes, the Fc region is composed of two identical protein fragments, derived from the second and third constant domains of the antibody's two heavy chains; IgM and IgE Fc regions contain three heavy chain constant domains ($C_H$ domains 2-4) in each polypeptide chain. The Fc regions of IgGs bear a highly conserved N-glycosylation site. Glycosylation of the Fc fragment is essential for Fc receptor-mediated activity. The N-glycans attached to this site are predominantly core-fucosylated diantennary structures of the complex type. In addition, small amounts of these N-glycans also bear bisecting GlcNAc and α-2,6 linked sialic acid residues. The other part of an antibody, called the Fab region, contains variable sections that define the specific target that the antibody can bind. The scFv of the disclosure are comprised of elements from the Fab region. By contrast, the Fc region of all antibodies in a class are the same for each species; they are constant rather than variable. The Fc region is, therefore, sometimes termed the "fragment constant region". Accordingly, the polynucleotide and polypeptide sequences which encode the Fc regions for countless species have been characterized.

Polynucleotide sequences encoding polypeptide components of the antibody or antibody fragments of the disclosure can be obtained using standard recombinant techniques. Desired polynucleotide sequences may be isolated and sequenced from antibody producing cells such as hybridoma cells. Alternatively, polynucleotides can be synthesized using nucleotide synthesizer or PCR techniques. Once obtained, sequences encoding the polypeptides are inserted into a recombinant vector capable of replicating and expressing heterologous polynucleotides in prokaryotic hosts. Many vectors that are available and known in the art can be used for the purpose of the present invention. Selection of an appropriate vector will depend mainly on the size of the nucleic acids to be inserted into the vector and the particular host cell to be transformed with the vector. Each vector contains various components, depending on its function (amplification or expression of heterologous polynucleotide, or both) and its compatibility with the particular host cell in which it resides. The vector components generally include, but are not limited to: an origin of replication, a selection marker gene, a promoter, a ribosome binding site (RBS), a signal sequence, the heterologous nucleic acid insert and a transcription termination sequence.

In general, plasmid vectors containing replicon and control sequences which are derived from species compatible with the host cell are used in connection with these hosts. The vector ordinarily carries a replication site, as well as marking sequences which are capable of providing phenotypic selection in transformed cells. For example, *E. Coli* is typically transformed using pBR322, a plasmid derived from an *E. Coli* species. pBR322 contains genes encoding ampicillin (Amp) and tetracycline (Tet) resistance and thus provides easy means for identifying transformed cells. pBR322, its derivatives, or other microbial plasmids or bacteriophage may also contain, or be modified to contain, promoters which can be used by the microbial organism for expression of endogenous proteins. Examples of pBR322 derivatives used for expression of particular antibodies are described in detail in Carter et al., U.S. Pat. No. 5,648,237.

In addition, phage vectors containing replicon and control sequences that are compatible with the host microorganism can be used as transforming vectors in connection with these hosts. For example, bacteriophage vectors may be utilized in making a recombinant vector which can be used to transform susceptible host cells such as *E. Coli* LE392.

The expression vector of the disclosure may comprise two or more promoter-cistron pairs, encoding each of the polypeptide components. A promoter is an untranslated regulatory sequence located upstream (5') to a cistron that modulates its expression. Prokaryotic promoters typically fall into two classes, inducible and constitutive. Inducible promoter is a promoter that initiates increased levels of transcription of the cistron under its control in response to changes in the culture condition, e.g. the presence or absence of a nutrient or a change in temperature.

A large number of promoters recognized by a variety of potential host cells are well known. The selected promoter can be operably linked to cistron DNA encoding the light or heavy chain by removing the promoter from the source DNA via restriction enzyme digestion and inserting the isolated promoter sequence into the vector of the invention. Both the native promoter sequence and many heterologous promoters may be used to direct amplification and/or expression of the target genes. In some embodiments, heterologous promoters are utilized, as they generally permit greater transcription and higher yields of expressed target gene as compared to the native target polypeptide promoter.

Promoters suitable for use with prokaryotic hosts include the PhoA promoter, the (3-galactamase and lactose promoter systems, a tryptophan (trp) promoter system and hybrid promoters such as the tac or the trc promoter. However, other promoters that are functional in bacteria (such as other known bacterial or phage promoters) are suitable as well. Their nucleotide sequences have been published, thereby enabling a skilled worker operably to ligate them to cistrons encoding the target light and heavy chains (Siebenlist et al. (1980) Cell 20: 269) using linkers or adaptors to supply any required restriction sites.

In one embodiment, each cistron within the recombinant vector comprises a secretion signal sequence component that directs translocation of the expressed polypeptides across a membrane. In general, the signal sequence may be a component of the vector, or it may be a part of the target polypeptide DNA that is inserted into the vector. The signal sequence selected for the purpose of this invention should be one that is recognized and processed (i.e. cleaved by a signal peptidase) by the host cell. For prokaryotic host cells that do not recognize and process the signal sequences native to the heterologous polypeptides, the signal sequence is substituted by a prokaryotic signal sequence selected, for example, from the group consisting of the alkaline phosphatase, penicillinase, Ipp, or heat-stable enterotoxin II (STII) leaders, LamB, PhoE, PelB, OmpA and MBP. In one embodiment of the invention, the signal sequences used in both cistrons of the expression system are STII signal sequences or variants thereof.

In another embodiment, the production of the immunoglobulins according to the disclosure can occur in the cytoplasm of the host cell, and therefore does not require the presence of secretion signal sequences within each cistron. In that regard, immunoglobulin light and heavy chains are expressed, folded and assembled to form functional immunoglobulins within the cytoplasm. Certain host strains (e.g., the *E. Coli* trxB-strains) provide cytoplasm conditions that are favorable for disulfide bond formation, thereby permitting proper folding and assembly of expressed protein subunits. Proba and Pluckthun Gene, 159:203 (1995).

Prokaryotic host cells suitable for expressing antibodies of the disclosure include Archaebacteria and Eubacteria, such as Gram-negative or Gram-positive organisms. Examples of useful bacteria include *Escherichia* (e.g., *E. Coli*), Bacilli (e.g., *B. subtilis*), Enterobacteria, *Pseudomonas* species (e.g., *P. aeruginosa*), *Salmonella typhimurium*, *Serratia marcescans*, *Klebsiella*, *Proteus*, *Shigella*, *Rhizobia*, *Vitreoscilla*, or *Paracoccus*. In one embodiment, gram-negative cells are used. In one embodiment, *E. Coli* cells are used as hosts for the disclosure. Examples of *E. Coli* strains include strain W3110 (Bachmann, Cellular and Molecular Biology, vol. 2 (Washington, D.C.: American Society for Microbiology, 1987), pp. 1190-1219; ATCC Deposit No. 27,325) and derivatives thereof, including strain 33D3 (U.S. Pat. No. 5,639,635). Other strains and derivatives thereof, such as *E. Coli* 294 (ATCC 31,446), *E. Coli* B, E. ColiX 1776 (ATCC 31,537) and *E. Coli* RV308 are also suitable. These examples are illustrative rather than limiting. Methods for constructing derivatives of any of the above-mentioned bacteria having defined genotypes are known in the art and described in, for example, Bass et al., Proteins, 8:309-314 (1990). It is generally important to select the appropriate bacteria taking into consideration replicability of the replicon in the cells of a bacterium. For example, *E. Coli*, *Serratia*, or *Salmonella* species can be suitably used as the host when well-known plasmids such as pBR322, pBR325, pACYC177, or pKN410 are used to supply the replicon. Typically, the host cell should secrete minimal amounts of proteolytic enzymes, and additional protease inhibitors may desirably be incorporated in the cell culture.

Host cells are transformed with the above-described expression vectors and cultured in conventional nutrient media modified as appropriate for inducing promoters, selecting transformants, or amplifying the genes encoding the desired sequences.

Transformation means introducing DNA into the prokaryotic host so that the DNA is replicable, either as an extrachromosomal element or by chromosomal integrant. Depending on the host cell used, transformation is done using standard techniques appropriate to such cells. The calcium treatment employing calcium chloride is generally used for bacterial cells that contain substantial cell-wall barriers. Another method for transformation employs polyethylene glycol/DMSO. Yet another technique used is electroporation.

Prokaryotic cells used to produce the polypeptides of the disclosure are grown in media known in the art and suitable for culture of the selected host cells. Examples of suitable media include Luria broth (LB) plus additional nutrient supplements. In some embodiments, the media also contains a selection agent, chosen based on the construction of the expression vector, to selectively permit growth of prokaryotic cells containing the expression vector. For example, ampicillin is added to media for growth of cells expressing ampicillin resistant gene.

Any additional supplements besides carbon, nitrogen, and inorganic phosphate sources may also be included at appropriate concentrations introduced alone or as a mixture with another supplement or medium such as a complex nitrogen source. Optionally the culture medium may contain one or more reducing agents selected from the group consisting of glutathione, cysteine, cystamine, thioglycollate, dithioerythritol and dithiothreitol. The prokaryotic host cells are cultured at suitable temperatures.

In one embodiment, the expressed polypeptides are secreted into and recovered from the periplasm of the host cells. Protein recovery typically involves disrupting the microorganism, generally by such means as osmotic shock, sonication or lysis. Once cells are disrupted, cell debris or whole cells may be removed by centrifugation or filtration. The proteins may be further purified, for example, by affinity resin chromatography. Alternatively, proteins can be transported into the culture media and isolated therein. Cells may be removed from the culture and the culture supernatant being filtered and concentrated for further purification of the proteins produced. The expressed polypeptides can be further isolated and identified using commonly known methods such as polyacrylamide gel electrophoresis (PAGE) and Western blot assay.

Large scale or small-scale fermentation can be used and can be optimized using skills well known in the art.

Standard protein purification methods known in the art can be employed. The following procedures are exemplary of suitable purification procedures: fractionation on immunoaffinity or ion-exchange columns, ethanol precipitation, reverse phase HPLC, chromatography on silica or on a cation-exchange resin such as DEAE, chromatofocusing, SDS-PAGE, ammonium sulfate precipitation, and gel filtration.

The disclosure further provides for an expression vector which encodes a scFv or humanized antibody disclosed herein that is transferred into a suitable host organism. The suitable host organism is a microorganism, yeast or a mammalian cell system. Typically, the mammalian cell system is monocyte-derived (e.g., macrophages, monocytes, and neutrophils), lymphocyte-derived (e.g., myeloma, hybridoma, and a normal immortalized B cell), parenchymal (e.g., hepatocytes) and non-parenchymal cells (e.g., stellate cells).

Additionally, the disclosure also provides for a unique transgenic animal model that expresses a scFv disclosed herein from both the liver and from macrophages. This animal model allows for a systematic study of the therapeutic effects of the scFvs of the disclosure in a wide variety of physiological and pathophysiological settings. It should also be understood that while the studies presented herein were conducted with a transgenic murine model that the methods and compositions presented herein can be equally as well be applied to create transgenic models in any number of animals including, but not limited to, rats, rabbits, pigs, sheep, goats, and horses. The disclosure, therefore, provides methods which can be performed in vivo to study the therapeutic possibilities of a scFv (humanized or non-humanized) of the disclosure or a humanized antibody of the disclosure in a highly defined manner. For example, a desirable scFv can be produced during cell culturing or in a transgenic animal. The availability of a transgenic animal model expressing a scFv disclosed herein allows for in-depth preclinical testing for myriad of potential applications. For example, interventions can be done on the transgenic animals to test the impact of scFv expression, including, by breeding the animals into a variety of backgrounds.

The scFvs disclosed herein bind to OxCEs and can block their pro-inflammatory effects. It is anticipated that the in vivo use of a scFv (humanized or non-humanized) of the disclosure or a humanized antibody of the disclosure can be used to block OxCE biological effects in many different situations.

Accordingly, the antibodies, antibody fragments and polypeptides of the disclosure can be used to treat inflammatory diseases and disorders, cardiovascular diseases, and diseases associated with oxidized cholesteryl esters. The term cardiovascular diseases, is intended to include but is not limited to atherosclerosis, acute coronary syndrome, acute myocardial infarction, myocardial infarction (heart attack), stable and unstable angina pectoris, aneurysms, coronary artery disease (CAD), ischemic heart disease, ischemic myocardium, cardiac and sudden cardiac death, cardiomyopathy, congestive heart failure, heart failure, stenosis, peripheral arterial disease (PAD), intermittent claudication, critical limb ischemia, and stroke.

As used herein, "treatment" refers to clinical intervention in an attempt to alter the natural course of the individual or cell being treated, and can be performed either for prophylaxis or during the course of clinical pathology. Desirable effects of treatment include preventing occurrence or recurrence of disease, alleviation of symptoms, diminishment of any direct or indirect pathological consequences of the disease, decreasing the rate of disease progression, amelioration or palliation of the disease state, and remission or improved prognosis. In some embodiments, a scFv (humanized or non-humanized) of the disclosure or a humanized antibody of the disclosure are used to delay development of a disease or disorder.

An "individual," "subject," or "patient" is a vertebrate. In certain embodiments, the vertebrate is a mammal. Mammals include, but are not limited to, farm animals (such as cows), sport animals, pets (such as cats, dogs, and horses), primates, mice and rats. In certain embodiments, a mammal is a human.

An "effective amount" refers to an amount effective, at dosages and for periods of time needed, to achieve the desired therapeutic or prophylactic result.

A "therapeutically effective amount" of an antibody or variants thereof of the disclosure may vary according to factors such as the disease state, age, sex, and weight of the individual, and the ability of the antibody or variants thereof to elicit a desired response in the individual. A therapeutically effective amount is also one in which any toxic or detrimental effects of the antibody or variants thereof are outweighed by the therapeutically beneficial effects. A "prophylactically effective amount" refers to an amount effective, at dosages and for periods of time needed, to achieve the desired prophylactic result. Typically, but not necessarily, since a prophylactic dose is used in subjects prior to or at an earlier stage of disease, the prophylactically effective amount will be less than the therapeutically effective amount.

Therapeutic formulations comprising an antibody or fragment thereof of the disclosure are prepared for storage by mixing the antibody or fragment having the desired degree of purity with optional physiologically acceptable carriers, excipients or stabilizers (Remington: The Science and Practice of Pharmacy 20th edition (2000)), in the form of aqueous solutions, lyophilized or other dried formulations. Acceptable carriers, excipients, or stabilizers are nontoxic to recipients at the dosages and concentrations employed, and include buffers such as phosphate, citrate, histidine and other organic acids; antioxidants including ascorbic acid and methionine; preservatives (such as octadecyldimethylbenzyl ammonium chloride; hexamethonium chloride; benzalkonium chloride, benzethonium chloride; phenol, butyl or benzyl alcohol; alkyl parabens such as methyl or propyl paraben; catechol; resorcinol; cyclohexanol; 3-pentanol; and m-cresol); low molecular weight (less than about 10 residues) polypeptides; proteins, such as serum albumin, gelatin, or immunoglobulins; hydrophilic polymers such as polyvinylpyrrolidone; amino acids such as glycine, glutamine, asparagine, histidine, arginine, or lysine; monosaccharides, disaccharides, and other carbohydrates including glucose, mannose, or dextrins; chelating agents such as EDTA; sugars such as sucrose, mannitol, trehalose or sorbitol; salt-forming counter-ions such as sodium; metal complexes (e.g., Zn-protein complexes); and/or non-ionic surfactants or polyethylene glycol (PEG).

The formulation herein may also contain more than one active compound as needed for the particular indication being treated, preferably those with complementary activities that do not adversely affect each other. Such molecules are suitably present in combination in amounts that are effective for the purpose intended.

The antibody or variants thereof may also be entrapped in microcapsule prepared, for example, by coacervation techniques or by interfacial polymerization, for example, hydroxymethylcellulose or gelatin-microcapsule and poly-(methylmethacylate) microcapsule, respectively, in colloidal drug delivery systems (for example, liposomes, albumin microspheres, microemulsions, nano-particles and nanocapsules) or in macroemulsions. Such techniques are disclosed in Remington: The Science and Practice of Pharmacy 20th edition (2000).

The formulations to be used for in vivo administration must be sterile. This is readily accomplished by filtration through sterile filtration membranes.

Sustained-release preparations may be prepared. Suitable examples of sustained-release preparations include semipermeable matrices of solid hydrophobic polymers containing the immunoglobulin of the invention, which matrices are in the form of shaped articles, e.g., films, or microcapsule. Examples of sustained-release matrices include polyesters, hydrogels (for example, poly(2-hydroxyethyl-methacrylate), or poly(vinylalcohol)), polylactides (U.S. Pat. No. 3,773,919), copolymers of L-glutamic acid and γethyl-L-glutamate, non-degradable ethylene-vinyl acetate, degradable lactic acid-glycolic acid copolymers such as the LUPRON DEPOT (injectable microspheres composed of lactic acid-glycolic acid copolymer and leuprolide acetate), and poly-D-(−)-3-hydroxybutyric acid. While polymers such as ethylene-vinyl acetate and lactic acid-glycolic acid enable release of molecules for over 100 days, certain hydrogels release proteins for shorter time periods. When encapsulated immunoglobulins remain in the body for a long time, they may denature or aggregate as a result of exposure to moisture at 37° C., resulting in a loss of biological activity and possible changes in immunogenicity. Rational strategies can be devised for stabilization depending on the mechanism involved. For example, if the aggregation mechanism is discovered to be intermolecular S—S bond formation through thio-disulfide interchange, stabilization may be achieved by modifying sulfhydryl residues, lyophilizing from acidic solutions, controlling moisture content, using appropriate additives, and developing specific polymer matrix compositions.

Anti-OxCE antibodies of the disclosure can be produced transgenically through the generation of a mammal or plant that is transgenic for the immunoglobulin heavy and light chain sequences of interest and production of the antibody in a recoverable form therefrom. In connection with the transgenic production in mammals, anti-OxCE antibodies can be produced in, and recovered from, the milk of goats, cows, or other mammals. See, e.g., U.S. Pat. Nos. 5,827,690, 5,756,687, 5,750,172, and 5,741,957, incorporated herein by reference.

In some embodiments, non-human transgenic animals or plants are produced by introducing one or more nucleic acid molecules encoding an anti-OxCE antibody or fragment thereof of the disclosure into the animal or plant by standard transgenic techniques. See Hogan and U.S. Pat. No. 6,417,429. The transgenic cells used for making the transgenic animal can be embryonic stem cells or somatic cells or a fertilized egg. The transgenic non-human organisms can be chimeric, nonchimeric heterozygotes, and nonchimeric homozygotes. See, e.g., Hogan et al., Manipulating the Mouse Embryo: A Laboratory Manual 2.sup.nd ed., Cold Spring Harbor Press (1999); Jackson et al., Mouse Genetics and Transgenics: A Practical Approach, Oxford University Press (2000); and Pinkert, Transgenic Animal Technology: A Laboratory Handbook, Academic Press (1999), all incorporated herein by reference. In some embodiments, the transgenic non-human animals have a targeted disruption and replacement by a targeting construct that encodes a heavy chain and/or a light chain of interest. In another embodiment, the transgenic animals comprise and express nucleic acid molecules encoding heavy and light chains that specifically bind to OxCE epitopes. In some embodiments, the transgenic animals comprise nucleic acid molecules encoding a modified antibody such as a single-chain antibody, a chimeric antibody or a humanized antibody. The antibodies may be made in any transgenic animal. In another embodiment, the non-human animals are mice, rats, sheep, pigs, goats, cattle or horses. The non-human transgenic animal expresses said encoded polypeptides in blood, milk, urine, saliva, tears, mucus and other bodily fluids.

The disclosure also provides diagnostics for measuring the presence of OxCEs on biologically relevant molecules including protein, peptides, and the like. For example, the disclosure provides methods of measuring the level of OxCEs on ApoB and ApoA (e.g., ApoAI) molecules. The level of OxCEs on such molecules can be used as indicators of disease, disease progression or disease remission. In particular, the methods of the disclosure provide methods of determining a subject risk or prognosis of cardiovascular disease by measuring the level of OxCEs on ApoB and/or ApoA in a sample from the subject. The method uses, for example, an antibody or antibody fragment of the disclosure as a detecting agent or capture agent. The methods and compositions of the disclosure are useful for diagnostic purposes and for monitoring the effects of drug and dietary interventions, as well as for monitoring treatment for reducing cholesterol and high LDL levels using drugs such as statins. More particularly, the disclosure relates to methods and compositions useful for determining OxCE/apoA and/or OxCE/apoB ratios as indices of atherosclerosis regression, reverse cholesterol metabolism and plaque stability.

In one embodiment, a method of determining whether a therapy is effective for treating cardiovascular or coronary artery disease is provided. The method includes obtaining a first sample comprising plasma from a subject; administering a therapy to the subject; obtaining a second sample from the subject following administration of the therapy; determining the level of OxCEs bound to Apolipoprotein A (apoA) and/or ApoB in the first sample and second sample; determining the level of total apoA and/or ApoB in the first sample and the second sample; and calculating the ratio of the OxCE level to the apoA and/or ApoB level for both samples. The information may be provided to a caregiver.

In some embodiments, the level of OxCE and the level of apoA and/or ApoB in the samples obtained from the subject are measured with two or more different biomolecules. The first biomolecule specifically interacts with OxCE (e.g., an AG23 antibody or fragment thereof) and the second biomolecule specifically interacts with apoA or apoB (e.g., MB47 mouse monoclonal Ab). In some embodiments, the biomolecules are antibodies, such as, for example, monoclonal antibodies. The antibody that interacts with OxCE may be, for example, AG23 antibody of the disclosure or binding fragment thereof.

In one embodiment, the disclosure relates to a method for measuring the plasma content of OxCE on apolipoprotein A particles (OxCE/apoA). For example, the content of OxCE and apoA may be measured with monoclonal antibodies that are specific for each of these constituents.

An exemplary biochemical test for identifying specific proteins, such as OxCE and apoA, employs a standardized test format, such as the Enzyme Linked Immunosorbent Assay or ELISA test, although the information provided herein may apply to the development of other biochemical or diagnostic tests and is not limited to the development of an ELISA test (see, e.g., Molecular Immunology: A Textbook, edited by Atassi et al. Marcel Dekker Inc., New York and Basel 1984, for a description of ELISA tests). It is understood that commercial assay enzyme-linked immunosorbant assay (ELISA) kits for various plasma constituents are available.

In another embodiment, an OxCE/apoA index is further correlated with, the age of the subject at the time the ratios are measured, the subject's gender, and/or the subject's race.

In another embodiment, an article of manufacture is provided. The article may include packaging material containing biomolecules that interact with OxCE (e.g., an antibody or antibody fragment of the disclosure) and apoA and/or apoB. The packaging material may include a label or package insert indicating that the biomolecules can be used for calculating a regression index by determining the ratio of the OxCE level to the apoA or ApoB levels.

In yet another embodiment, an array is provided. The array may include a substrate having a plurality of addresses, each address having disposed thereon a set of one or more biomolecules that specifically interact with OxCE or apoA or apoB.

The methods of the disclosure can be used with an array (i.e., "biochip" or "microarray") that includes immobilized biomolecules that facilitate the detection of a particular molecule or molecules in a biological sample. Biomolecules that identify the biomarkers described above can be included in a custom array for detecting OxCE or apoA or apoB. The array can also include biomolecules that identify additional factors indicative of the efficacy of a treatment for an OxCE disease or disorder. Additional biomolecules can be included in a custom array of the disclosure.

The term "array," as used herein, generally refers to a predetermined spatial arrangement of binding islands, biomolecules, or spatial arrangements of binding islands or biomolecules. Arrays according to the disclosure that include biomolecules immobilized on a surface may also be referred to as "biomolecule arrays." Arrays according to the disclosure that comprise surfaces activated, adapted, prepared, or modified to facilitate the binding of biomolecules to the surface may also be referred to as "binding arrays." The disclosure also contemplates surfaces bearing multiple arrays, referred to as "multiple arrays" or "repeating arrays." The use of the term "array" herein may encompass biomolecule arrays, binding arrays, multiple arrays, and any combination thereof, the appropriate meaning will be apparent from context. The biological sample can include fluid or solid samples from any tissue of the body including plasma.

An array of the disclosure or a solid phase comprises a substrate. By "substrate" or "solid support" or other grammatical equivalents, herein is meant any material appropriate for the attachment of biomolecules and is amenable to at least one detection method. As will be appreciated by those in the art, the number of possible substrates is very large. Possible substrates include, but are not limited to, glass and modified or functionalized glass, plastics (including acrylics, polystyrene and copolymers of styrene and other materials, polypropylene, polyethylene, polybutylene, polyurethanes, TEFLON®, etc.), polysaccharides, nylon or nitrocellulose, resins, silica or silica-based materials including silicon and modified silicon, carbon, metals, inorganic glasses, plastics, ceramics, and a variety of other polymers. In addition, as is known the art, the substrate may be coated with any number of materials, including polymers, such as dextrans, acrylamides, gelatins or agarose. Such coatings can facilitate the use of the array with a biological sample derived from serum.

A planar array of the disclosure will generally contain addressable locations (e.g., "pads", "addresses," or "microlocations") of biomolecules in an array format. The size of the array will depend on the composition and end use of the array. Arrays containing from about 2 different biomolecules to many thousands can be made. In some embodiments, the compositions of the disclosure may not be in an array format; that is, for some embodiments, compositions comprising a single biomolecule may be made as well. In addition, in some arrays, multiple substrates may be used, either of different or identical compositions. Thus, for example, large planar arrays may comprise a plurality of smaller substrates. Parallel microfluidic devices comprising arrays would be useful for parallel measurements of OxCE and ApoA or ApoB content of a biological sample.

As an alternative to planar arrays, bead based assays in combination with flow cytometry have been developed to perform multiparametric immunoassays. In bead based assay systems the biomolecules can be immobilized on addressable microspheres. Each biomolecule for each individual immunoassay is coupled to a distinct type of microsphere (i.e., "microbead") and the immunoassay reaction takes place on the surface of the microspheres. Dyed microspheres with discrete fluorescence intensities are loaded separately with their appropriate biomolecules. The different bead sets carrying different capture probes can be pooled as necessary to generate custom bead arrays. Bead arrays are then incubated with the sample in a single reaction vessel to perform the immunoassay.

Product formation of the biomarker with their immobilized capture biomolecules can be detected with a fluorescence based reporter system. Biomarkers can either be labeled directly by a fluorogen or detected by a second fluorescently labeled capture biomolecule. The signal intensities derived from captured biomarkers are measured in a flow cytometer. The flow cytometer first identifies each microsphere by its individual color code. Second the amount of captured biomarkers on each individual bead is measured by the second color fluorescence specific for the bound target. This allows multiplexed quantitation of multiple targets from a single sample within the same experiment. Sensitivity, reliability and accuracy are compared to standard microtiter ELISA procedures. With bead based immunoassay systems serum components can be simultaneously quantified from biological samples. An advantage of bead-based systems is the individual coupling of the capture biomolecule to distinct microspheres.

An array of the disclosure encompasses any means for detecting a biomarker molecule such as, for example, apoA and OxCE. For example, microarrays can be biochips that provide high-density immobilized arrays of recognition molecules (e.g., antibodies), where biomarker binding is monitored indirectly (e.g., via fluorescence). In addition, an array can be of a format that involves the capture of proteins by biochemical or intermolecular interaction, coupled with direct detection by mass spectrometry (MS).

Arrays and microarrays that can be used with the new methods to detect the biomarkers described herein can be made according to the methods described in U.S. Pat. Nos. 6,329,209; 6,365,418; 6,406,921; 6,475,808; and 6,475,809, and U.S. patent application Ser. No. 10/884,269, which are incorporated herein in their entirety. New arrays, to detect specific selections of sets of biomarkers described herein can also be made using the methods described in these patents.

Surfaces useful according to the disclosure may be of any desired shape (form) and size. Non-limiting examples of surfaces include chips, continuous surfaces, curved surfaces, flexible surfaces, films, plates, sheets, tubes, and the like. Surfaces have areas ranging from approximately a square micron to approximately 500 cm$^2$. The area, length, and width of surfaces according to the disclosure may be varied according to the requirements of the assay to be performed. Considerations may include, for example, ease of handling, limitations of the material(s) of which the surface is formed, requirements of detection systems, requirements of deposition systems (e.g., arrayers), and the like.

In certain embodiments, it is desirable to employ a physical means for separating groups or arrays of binding islands or immobilized biomolecules: such physical separation facilitates exposure of different groups or arrays to different solutions of interest. Therefore, in certain embodiments, arrays are situated within wells of 96, 384, 1536, or 3456 microwell plates. In such embodiments, the bottoms of the wells may serve as surfaces for the formation of arrays, or arrays may be formed on other surfaces and then placed into wells. In certain embodiments, such as where a surface without wells is used, binding islands may be formed or biomolecules may be immobilized on a surface and a gasket having holes spatially arranged so that they correspond to the islands or biomolecules may be placed on the surface. Such a gasket is preferably liquid tight. A gasket may be placed on a surface at any time during the process of making the array and may be removed if separation of groups or arrays is no longer necessary.

Modifications or binding of biomolecules in solution or immobilized on an array may be detected using detection techniques known in the art. Examples of such techniques include immunological techniques such as competitive binding assays and sandwich assays; fluorescence detection using instruments such as confocal scanners, confocal microscopes, or CCD-based systems and techniques such as fluorescence, fluorescence polarization (FP), fluorescence resonant energy transfer (FRET), total internal reflection fluorescence (TIRF), fluorescence correlation spectroscopy (FCS); colorimetric/spectrometric techniques; surface plasmon resonance, by which changes in mass of materials adsorbed at surfaces may be measured; techniques using radioisotopes, including conventional radioisotope binding and scintillation proximity assays so (SPA); mass spectroscopy, such as matrix-assisted laser desorption/ionization mass spectroscopy (MALDI) and MALDI-time of flight (TOF) mass spectroscopy; ellipsometry, which is an optical method of measuring thickness of protein films; quartz crystal microbalance (QCM), a very sensitive method for measuring mass of materials adsorbing to surfaces; scanning probe microscopies, such as AFM and SEM; and techniques such as electrochemical, impedance, acoustic, microwave, and IR/Raman detection. See, e.g., Mere L, et al., "Miniaturized FRET assays and microfluidics: key components for ultra-high-throughput screening," Drug Discovery Today 4(8):363-369 (1999), and references cited therein; Lakowicz J R, Principles of Fluorescence Spectroscopy, 2nd Edition, Plenum Press (1999).

In another embodiment, a pre-packaged diagnostic kit for determining whether a therapy is effective for treating coronary artery disease is provided. The kit may include an array as described above, instructions for using the array, and instructions for calculating a regression index by determining the ratio of the OxCE level to the apoA level (e.g., total apoA) or apoB levels (e.g., total apoB).

Arrays of the disclosure suitable for identifying cardiovascular and/or coronary artery disease, and the efficacy of a treatment therefore, may be included in kits. Such kits may also include, as non-limiting examples, reagents useful for preparing biomolecules for immobilization onto binding islands or areas of an array, reagents useful for detecting modifications to immobilized biomolecules, or reagents useful for detecting binding of biomolecules from solutions of interest to immobilized biomolecules, and instructions for use. Likewise, arrays comprising immobilized biomolecules may be included in kits. Such kits may also include, as non-limiting examples, reagents useful for detecting modifications to immobilized biomolecules or for detecting binding of biomolecules from solutions of interest to immobilized biomolecules.

In other embodiments, a method for identifying plaque regression, reverse cholesterol transport or stabilization in a blood vessel in a subject, is provided. The method includes obtaining a first sample comprising plasma from a subject; administering a therapy to the subject; obtaining a second sample from the subject following administration of the therapy; determining the level of OxCE in the first sample and second sample; determining the level of apoA in the first sample and the second sample; calculating a regression index by determining the ratio of the OxCE level to the apoA level for both samples. The information may be provided to a caregiver in various means including directly, paper printout over, computer screen or over the internet to a remote location.

The methods and compositions of the disclosure also provide a method of optimizing the treatment of a subject having or at risk of having a cardiovascular disease or disorder. The disclosure provides an approach to treating such a disorder by integrating diagnostics and therapeutics to improve the real-time treatment of a subject having, for example, a cardiovascular disease or disorder associated with cholesterol, HDL, or LDL content. For example, multiparameter immunoassays specific for a series of diagnostically relevant molecules such as OxCE, OxPL, apoA, or apoB can be used to follow the progress of a subject undergoing treatment. The markers provided herein are particularly adaptable for use in diagnosis and treatment because they are available in easily obtained body fluids such as blood or serum.

In one embodiment, the assay format comprises the capture of intact lipoprotein A species. Antibody or antibody fragments that bind to an apolipoprotein A or antigen of apolipoprotein A (e.g., an apolipoprotein A binding agent) can be used in the assay. The binding agent can be linked to a solid phase or support (e.g., a bead, tissue culture plate, glass slide or the like. The agent is bound to the solid phase either by adsorption thereon or by covalent attachment. This binding agent can be an antibody such as those commercially available from The Binding Site, Birmingham, England, but it may also be another agent having specificity for the apolipoprotein.

The test is most conveniently carried out in multiwell microtiter plates, such as Nunc Immunowells, (Irvine Scientific, Santa Ana, Calif.), but may also be performed in other solid phase media. The isolation of classes of intact lipoproteins should not be limited to techniques using only antibodies as binding agents. In the future, it is to be expected that other agents will be developed which specifically bind to apolipoprotein A polypeptides, peptides or antigens.

In one embodiment, the solid phase is coated with an antibody (or other binding agent) that interacts with an apolipoprotein A, such as for example apo AI and AII. Apolipoprotein A's are then separated from a sample of a specimen, such as for example, bodily fluids, tissue or cells, by allowing the lipoproteins to be bound thereto. The specimen may be any biological material containing lipoproteins, such as plasma or lymphatic fluid, or it may be the fluid portion of cells, such as those of the liver. The sample may be the crude specimen, or it may be a separated fraction, for example, a lipoprotein enriched sample, or a sample of an isolated lipoprotein class. The optimum time necessary for lipoprotein to bind quantitatively to the support can be determined empirically, by sequential trials.

After the lipoproteins are bound to the support, unbound lipoproteins are removed by rinsing with a buffer solution. Sites of the support which are available to non-specific binding maybe blocked by treatment with a solution containing a protein such as for example albumin or gelatin.

To determine "total" apolipoprotein A in a sample a secondary antibody that specifically binds apolipoprotein is added to the solid support/phase and allowed to incubate for a period of time sufficient to allow the secondary antibody to interact with an antigenic site on the apolipoprotein A bound to the solid substrate/phase. The secondary antibody may be detectably labeled such that suitable quantitation of the apolipoprotein A may be determined. Suitable labels include fluorescent labels, luminescent labels, radioactive labels, chromogenic labels and the like. Unbound antibody can then be removed from the sample by washing.

A sample run in parallel or from the same biological sample is also measured for the presence of oxCE on the bound apolipoprotein A. OxCE can be determined by using an antibody of the disclosure that interacts with the oxidized cholesterol esters.

The label attached to the probing antibodies may be an enzyme, such as peroxidase, alkaline phosphatase, or beta-galactosidase, as are commonly used in ELISA assays. These enzymes react with appropriate substrates to produce a colored compound, the concentration of which can be measured by its absorbance. In one embodiment of the test, however, the interaction of alkaline phosphatase or beta-galactosidase with a substrate methylumbelliferonyl phosphate generates a fluorescent product, detected by the same automated system used to measure the Nile Red binding.

Chemiluminescent enzyme-linked immunosorbent assay can be used also in apolipoprotein quantification. When the tagging enzyme is peroxidase, the detection system is Luminol/$H_2O_2$(Stevens, P. et al., Lab Res. Methods Biol. Med. 4:205 (1980) The amount of light produced in these reactions is quantified using appropriate light measuring devices such as ML 1000 microplate luminometer (Dynatech Lab, Inc., 14340 Sully Field Circle, Chantilly, Va. 22021). Typically, when either fluorescent or chemiluminescent signals are to be read, the test is carried out on black plates.

In other embodiments, the disclosure provides databases and computerized methods of analyzing and storing data associated with treatment regimens for atherosclerosis related diseases. A database generated by the methods and analyses described herein can be included in, or associated with, a computer system for determining whether a treatment is successful. The database can include a plurality of digitally encoded "reference" (or "control") profiles. Each reference profile of the plurality can have a plurality of values, each value representing a level of, for example, OxCE, OxPL, apoB or apoA detected in blood or serum of an individual having, or predisposed to having, an atherosclerosis related disorder. Alternatively, a reference profile can be derived from an individual who is normal. Both types of profiles can be included in the database for consecutive or simultaneous comparison to a subject profile. The computer system can include a server containing a computer-executable code for receiving a profile and identifying from the database a matching reference profile that is diagnostically relevant to the subject profile. The identified profile can be supplied to a caregiver for diagnosis or further analysis.

The following examples are intended to illustrate but not limit the disclosure. While they are typical of those that might be used, other procedures known to those skilled in the art may alternatively be used.

EXAMPLES

Human Plasma and Tissue Samples.

Human plasma, used for LDL isolation, was obtained from healthy volunteers. Human blood samples were also obtained from two previously published studies, the "UVA cohort" and the "PROXI cohort". Human carotid endarterectomy specimens were obtained from patients undergoing carotid endarterectomy.

Animals.

Mice were housed up to 5 per standard cage at room temperature and maintained on a 12:12 hour light:dark cycle, with lights on at 07:00. Both food and water were available ad libitum. Wild type C57BL/6 mice were initially purchased from Jackson Lab (Bar Harbor, Me.) and bred in-house.

Antigen Preparation.

The procedures for preparing OxCE-modified Keyhole limpet hemocyanin (KLH) and BSA were identical. To prepare the OxCE-BSA antigen, cholesteryl arachidonate (Nu-Check, Waterville, Minn.) was oxidized as described in Choi et al., (*PLoS One* 8:e83145 (2013)) to produce OxCE. One mg of OxCE dissolved in hexane was dried under argon in a glass tube, solubilized with 2.5 mL of 2.5 mg/mL BSA (Sigma) in PBS and incubated for 1 h at 37° C. with gentle agitation. After 1 h, this reaction mixture was added to an additional 1 mg of oxidized cholesteryl arachidonate dried in a separate glass tube, incubated, and the procedure was repeated one more time. This step-wise modification of the BSA with OxCE was used to prevent protein precipitation upon contact with a large amount of lipid. At the end of the last incubation, 25 µL of freshly prepared 30 mg/mL $NaBH_3CN$ in PBS was added to the tube and incubated overnight at 37° C. The solution was filtered through a 0.45 µm filter, dialyzed against PBS to remove unreacted $NaBH_3CN$, and sterile filtered again. The OxCE-BSA was aliquoted and frozen at −80° C. The peptide biotin-GDGDGK (G6K; from Biomatik, Wilmington, Del.) was modified with OxCE at a 1:1 molar ratio, using the same protocol as for OxCE-BSA. The biotin-GDGDGA peptide (G6A) in which the C-terminal Lys was replaced with Ala, served as a negative control. Modified LDL antigens were prepared as described in Gonen et al. (*J Lipid Res* 55:2137-2155 (2014)).

Immunization, Hybridma and Screening.

The protocol for generating OxCE-specific mAbs is as follows. Briefly, four male C57BL/6 mice (age 8-10 weeks) were immunized three times with OxCE-KLH emulsified 1:1 in incomplete Freund's adjuvant for a primary immunization and two boosts at two-week intervals, as illustrated in FIG. 1A. A week after the second boost, mice were bled, and IgG titers were measured by ELISA to assess direct binding to plated antigens OxCEKLH and OxCE-BSA as described in detail below. The two mice with the highest titers received an intravenous recall-boost with the antigen in PBS. Three days later, mice were sacrificed, splenocytes were collected and fused with myeloma cells (X36Ag8.653) using a ClonaCell™-HY Hybridoma kit (Stemcell Technologies, Cambridge, Mass.). The fused cells were resuspended in semi-solid HAT hybridoma selection medium. Two weeks later, visible colonies were transferred to Clona-Cell®-HY Growth Medium (DMEM, pre-selected serum, HT, gentamycin, and supplements). To select OxCE-specific but not KLH-specific colonies, media supernatants from hybridoma cells were screened by ELISA against OxCE-BSA, using an anti-mouse IgG detection antibody (Sigma-Aldrich, St. Louis, Mo.). Selected clones were sub-cloned by limiting dilution in semi-solid gel, without HAT, and re-tested by ELISA for binding to OxCE-BSA to ensure monoclonality. The selected colony (AG23) was expanded by BioXCell (West Lebanon, N.H.) in tissue culture in a stirred tank fermentation with Hybridoma-SFM medium supplemented with 1% Fetal Clone 3 (Life Technologies, Carlsbad, Calif.) and purified with chromatography over Protein A/G resin. The AG23 heavy and light chains were sequenced by Creative Biolabs (Shirley, N.Y.).

Mouse Atherosclerosis Study.

$Ldlr^{-/-}$ mice were initially purchased from Jackson Laboratory and bred in-house for experiments. $Alox15^{-/-}$ mice (Sun et al., J. Biol. Chem. 271:24055-24062, 1996) were crossbred in-house with $Ldlr^{-/-}$ mice. Male mice, starting at age 8 weeks, were fed a high-cholesterol normal-fat diet (Teklad TD 97131) containing 1% cholesterol for 16 weeks. Plasma total cholesterol (TC) was measured using automated enzymatic assays (Roche Diagnostics, Indianapolis, Ind.). Atherosclerosis was assessed; briefly, aortic root atherosclerosis was quantified by cutting cross sections starting from the aortic origin until the last leaflet. Sections were stained with a modified Van Gieson stain and lesion area was quantified via computer-assisted image analysis (Image-Pro, Media-Cybernetics, Rockville, Md.).

Western Blot

BSA or OxCE-BSA (0.5 µg/well) were subjected to gel electrophoresis and immunoblot as described in Choi et al. *Briefly, samples were loaded and run on a* 4-12% Bis-Tris gel (Life Technologies, Carlsbad, Calif.). Gels were incubated with Coomassie Blue for one hour or transferred to a PVDF membrane (Life Technologies, Carlsbad, Calif.). The membranes were incubated with primary antibodies (1 µg/mL in 1% BSA-TBS) overnight at 4° C., followed by incubation with secondary antibodies conjugated with HRP for 1 hour at room temperature and by detection with a Super Signal West Dura substrate (Thermo Fisher Scientific, Waltham, Mass.) and an OptiChem HR Imaging System (UVP, Upland, Calif.).

ELISA with Direct Antigen Plating.

Monoclonal antibody binding to an array of epitopes was measured by chemiluminescent ELISA as described in Gonen et al. In brief, wells were coated with antigens at 5 µg/mL in PBS overnight at 4° C. Following blocking with 1% BSA-TBS, hybridoma supernatant (undiluted) or purified mAb were added and incubated for 90 min at room temperature. Bound antibodies were detected using an anti-mouse IgG-alkaline phosphatase (AP) conjugate (Sigma-Aldrich, St. Louis, Mo.), a Lumi-Phos 530 substrate (Lumigen, Southfield, Mich.) and a Dynex luminometer (Dynex Technologies, Chantilly, Va.). Antibody binding was expressed as relative light units detected over 100 ms (RLU/100 ms)

Peptide Based ELISA.

Biotinylated short peptides G6A-OH, G6K-OH (non-modified) or G6K-OxCE (modified with OxCE) were immobilized to streptavidin pre-coated plates (Eagle Biosciences, Amherst, N.H.), at 10 µg/mL in PBS, overnight at 4° C. After washing with PBS, AG23 was added at 1 µg/mL in 1% BSA-TBS and incubated at room temperature for 90 min. The remaining ELISA was completed as described above.

Cometition ELISA.

A fixed and limiting concentration of AG23 was preincubated overnight in the absence or presence of increasing concentrations of various competitors. Immune complexes were pelleted by a 45 min spin at 11,000 rpm, and supernatants were used in an ELISA as described above. Concentration of plated antigens was 5 µg/mL. Results were expressed as B/Bo as described in Gonen et al.

Cholesterol Esterase Reaction.

An ELISA plate was coated with OxCE-BSA (1.25 µg/well) in PBS overnight at 4° C. After washing off unbound antigen, cholesterol esterase (MP Biomedicals, Santa Ana, Calif.) was added at 10 u/well in PBS and incubated for 3 h at 37° C. The solution was gently collected from wells and analyzed for free cholesterol, using a kit from BioVision (Milpitas, Calif.). The wells were then washed and used in the AG23 binding assay as described earlier.

Immunohistochemistry.

Paraffin embedded tissue were cut into 7 µm thick sections and mounted on charged slides. Sections were deparaffinized with Histoclear, rehydrated through graded ethanol, and blocked with 5% normal goat serum/1% BSA/TBS for 30 minutes at room temperature. AG23 (0.1 μg/mL) was preincubated overnight at 4° C. in the absence and presence of 5, 15 and 45 μg/mL of OxCE-BSA. Immune complexes were pelleted as above, and the supernatant was used to stain sections in a humidified chamber at 4° C. overnight. Sections were then incubated with an anti-mouse IgG-alkaline phosphatase (Sigma A3438) diluted with blocking buffer at 1:50 for 30 min at room temperature, then visualized with Vector Red substrate (Vector SK-5100). Finally, sections were counterstained with hematoxylin for 30 seconds, dehydrated through graded ethanol, cleared with Histoclear and coverslipped using Histomount. Immunostaining of consecutive sections in the absence of primary antibodies was used as negative controls. Images were captured with Hamamatsu Nanozoomer 2.0 HT Slide Scanner with a 20× lens.

Biomarker ELISA Assays.

To detect OxCE in human plasma, three sandwich ELISA protocols were tested. In Protocol 1, plates were coated with 5 μg/mL of MB47, a mouse monoclonal specific for human apoB-100 or with a sheep anti-human apoAI polyclonal Ab (Binding Site, Birmingham, UK), overnight at 4° C., followed by blocking with 1% BSA-TBS for 30 min at room temperature. Plasma samples (1:50) were added and incubated at room temperature for 90 min, followed by 0.1 μg/mL biotin-labeled anti-OxCE AG23 detection antibody, streptavidin-AP, and Lumi-Phos 530. In Protocol 2, plates were coated with 5 μg/mL AG23, blocked, incubated with 1:50 plasma samples, followed by 0.05 μg/mL goat anti-human apoB-100 polyclonal Ab or 0.1 μg/mL goat anti-human apoAI polyclonal Ab (both from Academy BioMed, Houston, Tex.), streptavidin-AP, and Lumi-Phos 530. In Protocol 3, plates were coated with 5 μg/mL unconjugated AG23 and detected with 0.1 μg/mL biotinylated AG23. This assay was called "total OxCE," in quotation marks because it detects OxCE irrespective of the lipoprotein or protein carrier, but only if more than one AG23-accessible OxCE epitopes are present.

Statistics.

Graphs represent mean±standard error as described in figure legends. Results were analyzed using Spearman correlation analysis, Student's t-test (for 2 groups) or one-way ANOVA (for more than 2 groups), as provided in Prism GraphPad, and the differences with P<0.05 were considered statistically significant.

Generation and Characterization of OxCE mAb.

Four mice were immunized with OxCE-KLH and screened for antibody production by binding to OxCE-BSA (see FIG. 1B). Hybridomas were generated from spleens of the 2 mice with the highest tiers and supernatants screened for IgG binding to OxCE-BSA. Clone 23 was selected for its robust IgG binding to OxCE-BSA but not BSA (see FIG. 1C). To ensure the monoclonality of the antibody, it was subjected to a single cell dilution, and all daughter clones were positive for OxCE-BSA binding (see FIG. D). The antibody, dubbed AG23, was sequenced (see SEQ ID NO:1 and 2 and SEQ ID NO:3 and 4 (nucleotide and amino acid sequences respectively), expanded and purified.

The AG23 antibody stained OxCE-BSA but not BSA on a western blot, while a control non-specific IgG1 stained neither (see FIG. 2A). AG23 did not bind to 2 other common OSEs, malondialdehyde (MDA)-modified LDL and oxidized phospholipid (OxPL) enriched in copper oxidized LDL (CuOxLDL) (see FIG. 2B). The low level of binding of AG23 to MDA-LDL is likely due to the presence of a small number of OxCE-apoB epitopes formed in LDL during the MDALDL preparation and/or following storage. OxCE-KLH but not KLH competed with OxCE-BSA for AG23 binding (see FIG. 2C), validating the specificity of the antibody to the OxCE epitope irrespective of the carrier protein. To further confirm the specificity of AG23 to the OxCE covalent modification of a protein, the GDGDGK peptide (G6K) was modified with OxCE, using the protocol utilized for the OxCE-BSA and OxCE-KLH modifications, and observed a robust AG23 binding to G6K-OxCE but not unmodified G6K-OH (see FIG. 2D). The OxCE modification procedure for the GDGDGA peptide (G6A), in which alanine replaces the C-terminal lysine, was not expected to result in a covalent bond between OxCE and the peptide, and indeed AG23 did not bind to the G6A/OxCE reaction product (see FIG. 2D). In a cross-competition assay, both OxCEBSA and G6K-OxCE competed each other for AG23 binding in a dose-dependent manner (see FIGS. 2E and F).

Incubation of OxCE-BSA with cholesterol esterase released free cholesterol, confirming hydrolysis of the ester bond in the OxCE epitope, and nullified AG23 binding to the OxCE-BSA from which cholesteryl was cleaved off (see FIG. 2G). This result suggests that the cholesterol moiety is part of the epitope recognized by AG23 or that it was important for the correct configuration of the AG23 epitope to be recognized.

Because OxCE products were detected in human atherosclerotic lesions, using lipid extraction and mass spectrometry technique, AG23 was tested whether it can detect OxCE in human lesions using immunohistochemistry. AG23 specifically stained sections of human carotid artery atherosclerotic lesions, and OxCE-BSA preincubated with AG23 competed with the tissue immunostaining in a dose-dependent manner (see FIG. 3). These results suggest that AG23 detects OxCE epitopes arising during the development of human atherosclerosis.

Figure 8C:
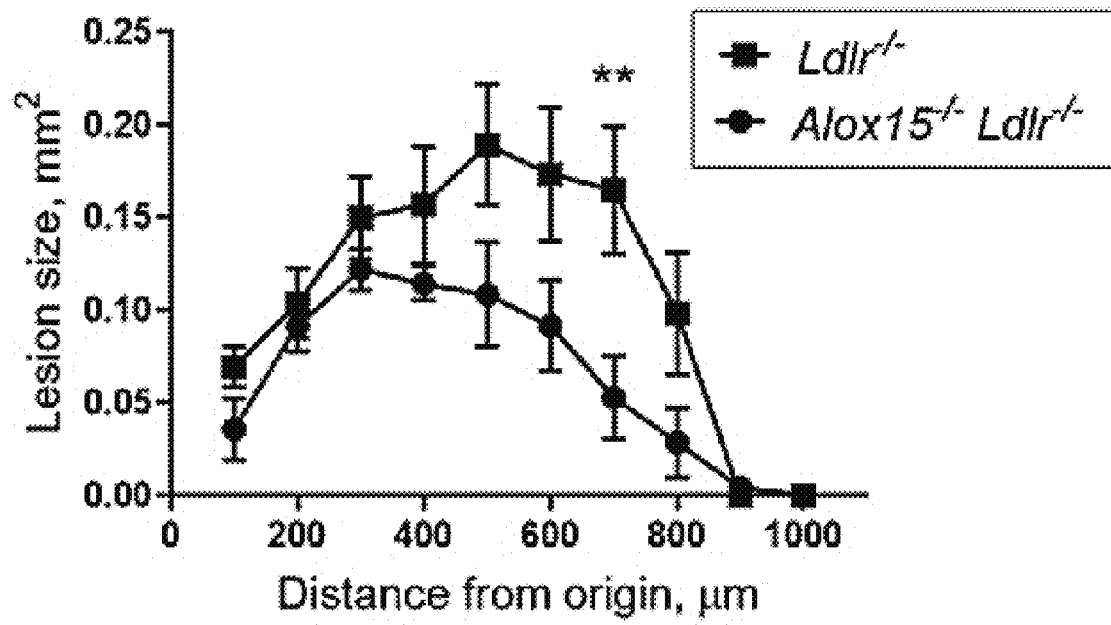

In an animal study, OxCE levels in plasma from Ldlr$^{-/-}$ and Alox15$^{-/-}$ Ldlr$^{-/-}$ mice fed a high cholesterol diet were compared. The enzyme 12/15-lipoxygenase (12/15LO; gene name Alox15) has been implicated as a major causative factor in lipoprotein oxidation in vivo, with CE being a preferential substrate for the 12/15LO activity. At the end of high-cholesterol diet feeding, levels of TC were not different (FIG. 9A), but the levels of OxCE were significantly lower in the plasma of Alox15$^{-/-}$ Ldlr$^{-/-}$ mice compared with that of Ldlr$^{-/-}$ mice (FIG. 8B). The lower plasma levels of OxCE corresponded with reduced size of atherosclerotic lesions in Alox15$^{-/-}$ Ldlr$^{-/-}$ mice (FIG. 8C).

OxCE Biomarker Immunoassay.

Whether OxCE epitopes in LDL captured on microtiter wells using the apoB-100 specific antibody MB-47 was next determined. LDL was captured from plasma samples on MB-47 coated wells and AG23 added to detect OxCE epitopes on the LDL (see FIG. 5A (A1)). However, detection levels were low for most of the samples (see FIG. 5B, empty bars), despite the efforts to optimize antigen/antibody concentrations and conditions of assay. Then, the sandwich was flipped and AG23 was used as a capture antibody and a biotinylated anti-apoB-100 as the detection antibody (see FIG. 5A (A2)). In this format, signal was robust, with a wide range of levels detected in different human plasma samples (see FIG. 5B, shaded bars). However, in this format, different amounts of LDL could be captured per well depending on the LDL concentration and/or captured LDL particles may have one or more OxCE epitopes.

To detect OxCE associated with apoAI lipoproteins, the same AG23 capture format was used, but the biotinylated apoB-100 antibody was replaced with a biotinylated anti-apoAI antibody. In this formulation, a robust signal for OxCE-apoA was detected, i.e., levels of apoAI lipoproteins with one or more OxCE epitope (see FIG. 5C, shaded bars). As shown in an assay of biotinylated G6K-OxCE (see FIG. 4), capture with AG23 allows for a 0.15-3.0 µM (0.01-0.2 µg/ml) linear range detection of OxCE epitopes. In a 1:50 human plasma, the upper limit of HDL particle concentration is 1.6 µM. If the assay format was flipped, and the apoAI lipoproteins were first captured on plate and then AG23 added, the resulting binding of AG23 was very low, below detection limit in the majority of samples (see FIG. 5C, empty bars). An association between OxCE and Lp(a) was not detected.

Next, an assay was designed in which AG23 was used as a capture antibody and biotinylated AG23 was used for detection (see FIG. 5A (A3)). This format would work only if lipoproteins or other proteins carry two or more OxCE epitopes accessible to AG23. The observation that low levels of binding were detected only in a few plasma samples and undetectable levels in most (see FIG. 5D) suggest that the majority of lipoproteins display only one or few OxCE epitopes accessible to AG23.

For illustrative purposes, the results of OxCE-apoB, OxCE-apoA and "total OxCE" measurements were combined in see FIG. 5E. However, note that absolute values in these 3 assays cannot be compared because they use different detection antibodies. Rather, FIG. 5E illustrates limited codependence between OxCE-apoB and OxCE-apoA levels. To further analyze co-variation of OxCE-apoB, OxCE-apoA and other common lipoprotein parameters in the UVA cohort (n=213), Spearman correlation coefficients were calculated. As shown in Table 1, r=0.293 between OxCE-apoB and OxCE-apoA suggests their limited co-variation. OxCE-apoA did not correlate with HDL-C. Remarkably, there was no correlation between OxPL-apoB (determined using the assay described by Taleb et al. (*Biomark.Med* 5:673-694 (2011)) and OxCE-apoB or OxCE-apoA Effect of Atatin Therapy on OxCE-apoB and OxCE-apoA.

Next, OxCE-apoB and OxCE-apoA was measured in plasma samples from PROXI, a randomized, parallel-arm, double-blind, placebo-controlled trial in which human subjects received placebo, 10 mg atorvastatin, 80 mg atorvastatin, or 40 mg pravastatin daily; blood was collected at baseline and after 16 weeks of treatment. At baseline, there was no difference in OxCE-apoB or OxCE-apoA levels between placebo and atorvastatin groups. After 16 weeks of treatment, OxCE-apoB levels were significantly reduced in 10 mg and 80 mg atorvastatin groups compared to placebo (see FIG. 6A). However, this co-varied with the reductions in apoB-100 levels (see FIG. 6B).

In contrast to reducing apoB-100, statins do not significantly change apoAI levels. Indeed, atorvastatin treatment (both 10 and 80 mg)-mediated reductions in OxCE-apoA levels (see FIG. 6C) were not accompanied by changes in apoAI (see FIG. 6D).

Further, individual changes in OxCE parameters were calculated for each subject before and after treatment. As expected, atorvastatin reduced both OxCE-apoB and apoB-100 in the majority of subjects (see FIGS. 7A and 7B). However, in the absence of apoAI changes, OxCE-apoA was significantly reduced following treatment in the 80 mg atorvastatin but not the placebo group (see FIGS. 7C and 7D). Correlation analysis of OxCE parameters in all samples used in this study demonstrated little co-variance with relevant lipoprotein measurements and, remarkably, there was no correlation between OxPL-apoB and OxCE-apoB nor OxCE-apoA (Table 2).

TABLE 1

Correlation matrix for OxCE-apoB and OxCE-apoA vs. OxPL-apoB and common lipoprotein biomarkers in UVA cohort.

|           | OxCE-apoB        | OxCE-apoA        | TC               | LDL-C            |
|-----------|------------------|------------------|------------------|------------------|
| OxCE-apoB | —                | 0.293 (<0.0001)  | 0.357 (<0.0001)  | 0.231 (<0.001)   |
| OxCE-apoA | 0.293 (<0.0001)  | —                | 0.445 (<0.0001)  | 0.422 (<0.0001)  |
| TC        | 0.357 (<0.0001)  | 0.445 (<0.0001)  | —                | 0.942 (<0.0001)  |
| LDL-C     | 0.231 (<0.001)   | 0.422 (<0.0001)  | 0.942 (<0.0001)  | —                |
| HDL-C     | 0.031 (n.s.)     | −0.027 (n.s.)    | 0.369 (<0.0001)  | 0.276 (<0.0001)  |
| TG        | 0.460 (<0.0001)  | 0.193 (<0.005)   | 0.292 (<0.0001)  | 0.166 (<0.05)    |
| OxPL-apoB | −0.029 (n.s.)    | −0.043 (n.s.)    | −0.054 (n.s.)    | −0.092 (n.s.)    |

|           | HDL-C            | TG               | OxPL-apoB        |
|-----------|------------------|------------------|------------------|
| OxCE-apoB | 0.031 (n.s.)     | 0.460 (<0.0001)  | 0.029 (n.s.)     |
| OxCE-apoA | −0.027 (n.s.)    | 0.193 (<0.005)   | −0.043 (n.s.)    |
| TC        | 0.369 (<0.0001)  | 0.292 (<0.0001)  | −0.054 (n.s.)    |
| LDL-C     | 0.276 (<0.0001)  | 0.166 (<0.05)    | −0.092 (n.s.)    |
| HDL-C     | —                | −0.443 (<0.0001) | −0.022 (n.s.)    |
| TG        | −0.443 (<0.0001) | —                | 0.089 (n.s.)     |
| OxPL-apoB | −0.022 (n.s.)    | 0.089 (n.s.)     | —                |

Correlation coefficient (P-value).

N = 213; nonparametric Spearman test.

TG, triglycerides, n.s., nonsignificant.

TABLE 2

Correlation matrix for OxCE-apoA vs. OxPL-apoB and common lipoprotein biomarkers in PROXI cohorts.

|  | OxCE-apoB | OxCE-apoA | TC | LDL-C | HDL-C |
|---|---|---|---|---|---|
| OxCE-apoB | — | 0.426 (<0.0001) | 0.379 (<0.0001) | 0.413 (<0.0001) | −0.169 (<0.05) |
| OxCE-apoA | 0.426 (<0.0001) | — | 0.362 (<0.0001) | 0.216 (<0.01) | 0.050 (n.s.) |
| TC | 0.379 (<0.0001) | 0.362 (<0.0001) | — | 0.947 (<0.0001) | −0.051 (n.s.) |
| LDL-C | 0.413 (<0.0001) | 0.216 (<0.01) | 0.947 (<0.0001) | — | −0.118 (n.s.) |
| HDL-C | −0.169 (<0.05) | 0.050 (n.s.) | −0.051 (n.s.) | −0.118 (n.s.) | — |
| apoB-100 | 0.427 (<0.0001) | 0.211 (<0.01) | 0.880 (<0.0001) | 0.853 (<0.0001) | −0.272 (<0.001) |
| apoAI | −0.085 (n.s.) | 0.152 (n.s.) | 0.068 (n.s.) | −0.047 (n.s.) | 0.828 (<0.0001) |
| TG | 0.179 (<0.05) | 0.344 (<0.0001) | 0.454 (<0.0001) | 0.272 (<0.001) | −0.448 (<0.0001) |
| OxPL-apoB | 0.003 (n.s.) | 0.008 (n.s.) | −0.074 (n.s.) | −0.039 (n.s.) | 0.060 (n.s.) |

|  | apoB-100 | apoAI | TG | OxPL-apoB |
|---|---|---|---|---|
| OxCE-apoB | 0.427 (<0.0001) | −0.085 (n.s.) | 0.179 (<0.05) | 0.003 (n.s.) |
| OxCE-apoA | 0.211 (<0.01) | 0.152 (n.s.) | 0.344 (<0.0001) | 0.008 (n.s.) |
| TC | 0.830 (<0.0001) | 0.068 (n.s.) | 0.454 (<0.0001) | −0.074 (n.s.) |
| LDL-C | 0.853 (<0.0001) | −0.047 (n.s.) | 0.272 (<0.001) | −0.039 (n.s.) |
| HDL-C | −0.272 (<0.001) | 0.828 (<0.0001) | −0.448 (<0.0001) | 0.060 (n.s.) |
| apoB-100 | — | −0.097 (n.s.) | 0.447 (<0.0001) | −0.044 (n.s.) |
| apoAI | −0.097 (n.s.) | — | −0.147 (n.s.) | 0.069 (n.s.) |
| TG | 0.447 (<0.0001) | −0.147 (n.s.) | — | −0.108 (n.s.) |
| OxPL-apoB | −0.044 (n.s.) | 0.07 (n.s.) | −0.108 (n.s.) | — |

Correlation coefficient (P-value).
Both baseline and post-treatment samples (n = 160) were analyzed by nonparametric Spearman test.
TG, triglycerides; n.s., nonsignificant.

Certain embodiments of the invention have been described. It will be understood that various modifications may be made without departing from the spirit and scope of the invention. Other embodiments are within the scope of the following claims.

---

What is claimed is:

1. An isolated antibody or antibody fragment comprising a variable heavy chain (VH) domain and a variable light chain (VL) domain;
    wherein the VH domain comprises SEQ ID NO:2; and
    wherein the VL domain comprises SEQ ID NO:4,
    wherein the antibody or antibody fragment binds to an oxidized cholesteryl ester (OxCE) of arachidonic acid.

2. The isolated antibody or antibody fragment of claim 1, wherein the isolated antibody is a monoclonal antibody.

3. The isolated antibody or antibody fragment of claim 2, wherein the isolated antibody is a murine monoclonal antibody.

4. The isolated antibody or antibody fragment of claim 1, wherein the antibody is a humanized antibody.

5. The isolated antibody or antibody fragment of claim 1, wherein the heavy and light chain domains are linked to an Fc region.

6. The isolated antibody or antibody fragment of claim 1, wherein the antibody is further conjugated to an enzyme, a fluorophore, a hapten, an imaging agent, a radiolabel, or a contrast agent.

7. A single chain variable fragment ("scFv") that comprises a VH domain,
wherein the VH domain comprises SEQ ID NO:2; and
wherein the VL domain comprises SEQ ID NO:4,
wherein the scFv binds to an oxidized cholesteryl ester (OxCE) of arachidonic acid.

8. The scFV of claim 7, wherein the scFv is soluble under physiological conditions.

9. The scFV of claim 7, wherein the scFV is further conjugated to an enzyme, a fluorophore, a hapten, an imaging agent, a radiolabel, or a contrast agent.

10. A polynucleotide that encodes the isolated antibody or antibody fragment of claim 1, or the scFv of claim 7.

11. The polynucleotide of claim 10, wherein the polynucleotide comprises a sequence that is at least 75% identical to SEQ ID NO:1 and/or 3 and which encodes an antibody, antibody fragment or scFv, wherein the antibody, antibody fragment or scFv comprises SEQ ID NO:2 and SEQ ID NO:4,
wherein the antibody, antibody fragment or scFv binds to an oxidized cholesteryl ester (OxCE) of arachidonic acid.

12. A vector comprising the polynucleotide of claim 10.

13. A host cell transformed with the polynucleotide of claim 10.

14. A method of detecting apolipoprotein (Apo) A (ApoA) and/or ApoB in a sample obtained from a subject comprising:
contacting the sample with the isolated antibody or antibody fragment of claim 1; and
adding a detecting agent to quantify and/or detect the amount of bound isolated antibody or antibody fragment in the sample.

15. An immunoassay comprising: (1) a capture antibody; and (2) a detection antibody that is conjugated to a detectable label,
wherein, one of the capture antibody or the detection antibody is the isolated antibody or antibody fragment of claim 1.

16. The immunoassay of claim 15, wherein the capture antibody or the detection antibody that is not the isolated antibody or antibody fragment, is antibody specific for human apoB-100, an antibody specific for human apoA1, an antibody specific for mouse IgG, an antibody specific for human low-density lipoprotein (LDL), and an antibody specific for human oxidized LDL (OxLDL).

* * * * *

SEQUENCE LISTING

<160> NUMBER OF SEQ ID NOS: 4

<210> SEQ ID NO 1
<211> LENGTH: 1320
<212> TYPE: DNA
<213> ORGANISM: Artificial Sequence
<220> FEATURE:
<223> OTHER INFORMATION: Variable Heavy Chain of AG23
<220> FEATURE:
<221> NAME/KEY: CDS
<222> LOCATION: (1)..(1320)

<400> SEQUENCE: 1

```
gag gtc cag ctg cag cag tct gga cct gag ctg gtg aaa cct ggg gct      48
Glu Val Gln Leu Gln Gln Ser Gly Pro Glu Leu Val Lys Pro Gly Ala
1               5                   10                  15 tca gtg aag ata tcc tgc aag gct tct ggt tac tca ttc act ggc tac      96
Ser Val Lys Ile Ser Cys Lys Ala Ser Gly Tyr Ser Phe Thr Gly Tyr
            20                  25                  30 tac atg aac tgg gtg agg caa agt cct gaa aag aac ctt gag tgg att     144
Tyr Met Asn Trp Val Arg Gln Ser Pro Glu Lys Asn Leu Glu Trp Ile
        35                  40                  45 gga gag att aat cct tac act ggt ggt acg acc tat aat cag aag ttc     192
Gly Glu Ile Asn Pro Tyr Thr Gly Gly Thr Thr Tyr Asn Gln Lys Phe
    50                  55                  60 aag gcc agg gcc aca ttg act gta gac aaa tcc tcc agt aca gcc tac     240
Lys Ala Arg Ala Thr Leu Thr Val Asp Lys Ser Ser Ser Thr Ala Tyr
65                  70                  75                  80 gtg cag ctc aag agc ctg aca tct gag gac tct gca gtt tat ttt tgt     288
Val Gln Leu Lys Ser Leu Thr Ser Glu Asp Ser Ala Val Tyr Phe Cys
                85                  90                  95
```

```
gta agt tgg gat tac gac ctt gac tac tgg ggc caa ggc acc act ctc      336
Val Ser Trp Asp Tyr Asp Leu Asp Tyr Trp Gly Gln Gly Thr Thr Leu
            100                 105                 110 aca gtc tcc tca gcc aaa acg aca ccc cca tct gtc tat cca ctg gcc      384
Thr Val Ser Ser Ala Lys Thr Thr Pro Pro Ser Val Tyr Pro Leu Ala
        115                 120                 125 cct gga tct gct gcc caa act aac tcc atg gtg acc ctg gga tgc ctg      432
Pro Gly Ser Ala Ala Gln Thr Asn Ser Met Val Thr Leu Gly Cys Leu
    130                 135                 140 gtc aag ggc tat ttc cct gag cca gtg aca gtg acc tgg aac tct gga      480
Val Lys Gly Tyr Phe Pro Glu Pro Val Thr Val Thr Trp Asn Ser Gly
145                 150                 155                 160 tcc ctg tcc agc ggt gtg cac acc ttc cca gct gtc ctg cag tct gac      528
Ser Leu Ser Ser Gly Val His Thr Phe Pro Ala Val Leu Gln Ser Asp
                165                 170                 175 ctc tac act ctg agc agc tca gtg act gtc ccc tcc agc acc tgg ccc      576
Leu Tyr Thr Leu Ser Ser Ser Val Thr Val Pro Ser Ser Thr Trp Pro
            180                 185                 190 agc cag acc gtc acc tgc aac gtt gcc cac ccg gcc agc agc acc aag      624
Ser Gln Thr Val Thr Cys Asn Val Ala His Pro Ala Ser Ser Thr Lys
        195                 200                 205 gtg gac aag aaa att gtg ccc agg gat tgt ggt tgt aag cct tgc ata      672
Val Asp Lys Lys Ile Val Pro Arg Asp Cys Gly Cys Lys Pro Cys Ile
    210                 215                 220 tgt aca gtc cca gaa gta tca tct gtc ttc atc ttc ccc cca aag ccc      720
Cys Thr Val Pro Glu Val Ser Ser Val Phe Ile Phe Pro Pro Lys Pro
225                 230                 235                 240 aag gat gtg ctc acc att act ctg act cct aag gtc acg tgt gtt gtg      768
Lys Asp Val Leu Thr Ile Thr Leu Thr Pro Lys Val Thr Cys Val Val
                245                 250                 255 gta gac atc agc aag gat gat ccc gag gtc cag ttc agc tgg ttt gta      816
Val Asp Ile Ser Lys Asp Asp Pro Glu Val Gln Phe Ser Trp Phe Val
            260                 265                 270 gat gat gtg gag gtg cac aca gct cag acg aaa ccc cgg gag gag cag      864
Asp Asp Val Glu Val His Thr Ala Gln Thr Lys Pro Arg Glu Glu Gln
        275                 280                 285 atc aac agc act ttc cgt tca gtc agt gaa ctt ccc atc atg cac cag      912
Ile Asn Ser Thr Phe Arg Ser Val Ser Glu Leu Pro Ile Met His Gln
    290                 295                 300 gac tgg ctc aat ggc aag gag ttc aaa tgc agg gtc aac agt gca gct      960
Asp Trp Leu Asn Gly Lys Glu Phe Lys Cys Arg Val Asn Ser Ala Ala
305                 310                 315                 320 ttc cct gcc ccc atc gag aaa acc atc tcc aaa acc aaa ggc aga ccg     1008
Phe Pro Ala Pro Ile Glu Lys Thr Ile Ser Lys Thr Lys Gly Arg Pro
                325                 330                 335 aag gct cca cag gtg tac acc att cca cct ccc aag gag cag atg gcc     1056
Lys Ala Pro Gln Val Tyr Thr Ile Pro Pro Pro Lys Glu Gln Met Ala
            340                 345                 350 aag gat aaa gtc agt ctg acc tgc atg ata aca aac ttc ttc cct gaa     1104
Lys Asp Lys Val Ser Leu Thr Cys Met Ile Thr Asn Phe Phe Pro Glu
        355                 360                 365 gac att act gtg gag tgg cag tgg aat ggg cag cca gcg gag aac tac     1152
Asp Ile Thr Val Glu Trp Gln Trp Asn Gly Gln Pro Ala Glu Asn Tyr
    370                 375                 380 aag aac act cag ccc atc atg gac aca gat ggc tct tac ttc gtc tac     1200
Lys Asn Thr Gln Pro Ile Met Asp Thr Asp Gly Ser Tyr Phe Val Tyr
385                 390                 395                 400 agc aag ctc aat gtg cag aag agc aac tgg gag gca gga aat act ttc     1248
Ser Lys Leu Asn Val Gln Lys Ser Asn Trp Glu Ala Gly Asn Thr Phe
                405                 410                 415
```

```
acc tgc tct gtg tta tat gag ggc ctg cac aac cac cat act gag aag    1296
Thr Cys Ser Val Leu Tyr Glu Gly Leu His Asn His His Thr Glu Lys
        420                 425                 430 agc ctc tcc cac tct cct ggt aaa                                    1320
Ser Leu Ser His Ser Pro Gly Lys
        435                 440

<210> SEQ ID NO 2
<211> LENGTH: 440
<212> TYPE: PRT
<213> ORGANISM: Artificial Sequence
<220> FEATURE:
<223> OTHER INFORMATION: Synthetic Construct

<400> SEQUENCE: 2

Glu Val Gln Leu Gln Gln Ser Gly Pro Glu Leu Val Lys Pro Gly Ala
1               5                   10                  15

Ser Val Lys Ile Ser Cys Lys Ala Ser Gly Tyr Ser Phe Thr Gly Tyr
            20                  25                  30

Tyr Met Asn Trp Val Arg Gln Ser Pro Glu Lys Asn Leu Glu Trp Ile
        35                  40                  45

Gly Glu Ile Asn Pro Tyr Thr Gly Gly Thr Thr Tyr Asn Gln Lys Phe
    50                  55                  60

Lys Ala Arg Ala Thr Leu Thr Val Asp Lys Ser Ser Ser Thr Ala Tyr
65                  70                  75                  80

Val Gln Leu Lys Ser Leu Thr Ser Glu Asp Ser Ala Val Tyr Phe Cys
                85                  90                  95

Val Ser Trp Asp Tyr Asp Leu Asp Tyr Trp Gly Gln Gly Thr Thr Leu
            100                 105                 110

Thr Val Ser Ser Ala Lys Thr Thr Pro Pro Ser Val Tyr Pro Leu Ala
        115                 120                 125

Pro Gly Ser Ala Ala Gln Thr Asn Ser Met Val Thr Leu Gly Cys Leu
    130                 135                 140

Val Lys Gly Tyr Phe Pro Glu Pro Val Thr Val Thr Trp Asn Ser Gly
145                 150                 155                 160

Ser Leu Ser Ser Gly Val His Thr Phe Pro Ala Val Leu Gln Ser Asp
                165                 170                 175

Leu Tyr Thr Leu Ser Ser Ser Val Thr Val Pro Ser Ser Thr Trp Pro
            180                 185                 190

Ser Gln Thr Val Thr Cys Asn Val Ala His Pro Ala Ser Ser Thr Lys
        195                 200                 205

Val Asp Lys Lys Ile Val Pro Arg Asp Cys Gly Cys Lys Pro Cys Ile
    210                 215                 220

Cys Thr Val Pro Glu Val Ser Ser Val Phe Ile Phe Pro Pro Lys Pro
225                 230                 235                 240

Lys Asp Val Leu Thr Ile Thr Leu Thr Pro Lys Val Thr Cys Val Val
                245                 250                 255

Val Asp Ile Ser Lys Asp Asp Pro Glu Val Gln Phe Ser Trp Phe Val
            260                 265                 270

Asp Asp Val Glu Val His Thr Ala Gln Thr Lys Pro Arg Glu Glu Gln
        275                 280                 285

Ile Asn Ser Thr Phe Arg Ser Val Ser Glu Leu Pro Ile Met His Gln
    290                 295                 300

Asp Trp Leu Asn Gly Lys Glu Phe Lys Cys Arg Val Asn Ser Ala Ala
305                 310                 315                 320
```

```
Phe Pro Ala Pro Ile Glu Lys Thr Ile Ser Lys Thr Lys Gly Arg Pro
                325                 330                 335

Lys Ala Pro Gln Val Tyr Thr Ile Pro Pro Lys Glu Gln Met Ala
        340                 345                 350

Lys Asp Lys Val Ser Leu Thr Cys Met Ile Thr Asn Phe Phe Pro Glu
        355                 360                 365

Asp Ile Thr Val Glu Trp Gln Trp Asn Gly Gln Pro Ala Glu Asn Tyr
        370                 375                 380

Lys Asn Thr Gln Pro Ile Met Asp Thr Asp Gly Ser Tyr Phe Val Tyr
385                 390                 395                 400

Ser Lys Leu Asn Val Gln Lys Ser Asn Trp Glu Ala Gly Asn Thr Phe
                405                 410                 415

Thr Cys Ser Val Leu Tyr Glu Gly Leu His Asn His His Thr Glu Lys
                420                 425                 430

Ser Leu Ser His Ser Pro Gly Lys
                435                 440

<210> SEQ ID NO 3
<211> LENGTH: 639
<212> TYPE: DNA
<213> ORGANISM: Artificial Sequence
<220> FEATURE:
<223> OTHER INFORMATION: Variable Light Chain Ag23
<220> FEATURE:
<221> NAME/KEY: CDS
<222> LOCATION: (1)..(639)

<400> SEQUENCE: 3 caa att gtt ctc acc cag tct cca gca ttc atg tct gca tct cca ggg     48
Gln Ile Val Leu Thr Gln Ser Pro Ala Phe Met Ser Ala Ser Pro Gly
1               5                   10                  15 gag aag gtc acc atg acc tgc agt gcc agc tca agt gta agt tac atg     96
Glu Lys Val Thr Met Thr Cys Ser Ala Ser Ser Ser Val Ser Tyr Met
            20                  25                  30 cac tgg tac cag cag aag tca ggc acg tcc ccc aaa aga tgg att tat    144
His Trp Tyr Gln Gln Lys Ser Gly Thr Ser Pro Lys Arg Trp Ile Tyr
        35                  40                  45 gcc aca tcc aaa gtg gct tct ggg gtc cct gct cgc ttc agt ggc agt    192
Ala Thr Ser Lys Val Ala Ser Gly Val Pro Ala Arg Phe Ser Gly Ser
    50                  55                  60 ggg tct ggg acc tct tac tct ctc aca atc agc agc atg gag gct gaa    240
Gly Ser Gly Thr Ser Tyr Ser Leu Thr Ile Ser Ser Met Glu Ala Glu
65                  70                  75                  80 gat gct gcc act tat tac tgc ctg cag tgg agt agt aac cca tac acg    288
Asp Ala Ala Thr Tyr Tyr Cys Leu Gln Trp Ser Ser Asn Pro Tyr Thr
                85                  90                  95 ttc gga ggg ggg acc aag ctg gag ata aaa cgg gct gat gct gca cca    336
Phe Gly Gly Gly Thr Lys Leu Glu Ile Lys Arg Ala Asp Ala Ala Pro
            100                 105                 110 act gta tcc atc ttc cca cca tcc agt gag cag tta aca tct gga ggt    384
Thr Val Ser Ile Phe Pro Pro Ser Ser Glu Gln Leu Thr Ser Gly Gly
        115                 120                 125 gcc tca gtc gtg tgc ttc ttg aac aac ttc tac ccc aaa gac atc aat    432
Ala Ser Val Val Cys Phe Leu Asn Asn Phe Tyr Pro Lys Asp Ile Asn
    130                 135                 140 gtc aag tgg aag att gat ggc agt gaa cga caa aat ggc gtc ctg aac    480
Val Lys Trp Lys Ile Asp Gly Ser Glu Arg Gln Asn Gly Val Leu Asn
145                 150                 155                 160 agt tgg act gat cag gac agc aaa gac agc acc tac agc atg agc agc    528
Ser Trp Thr Asp Gln Asp Ser Lys Asp Ser Thr Tyr Ser Met Ser Ser
```

|  |  |  |  | 165 |  |  |  | 170 |  |  |  | 175 |  |  |
|---|---|---|---|---|---|---|---|---|---|---|---|---|---|---|---|
| acc | ctc | acg | ttg | acc | aag | gac | gag | tat | gaa | cga | cat | aac | agc | tat | acc | 576 |
| Thr | Leu | Thr | Leu | Thr | Lys | Asp | Glu | Tyr | Glu | Arg | His | Asn | Ser | Tyr | Thr |
|  |  |  | 180 |  |  |  |  | 185 |  |  |  |  | 190 |  |  |
| tgt | gag | gcc | act | cac | aag | aca | tca | act | tca | ccc | att | gtc | aag | agc | ttc | 624 |
| Cys | Glu | Ala | Thr | His | Lys | Thr | Ser | Thr | Ser | Pro | Ile | Val | Lys | Ser | Phe |
|  |  | 195 |  |  |  |  | 200 |  |  |  |  | 205 |  |  |  |
| aac | agg | aat | gag | tgt |  |  |  |  |  |  |  |  |  |  |  | 639 |
| Asn | Arg | Asn | Glu | Cys |
|  | 210 |

<210> SEQ ID NO 4
<211> LENGTH: 213
<212> TYPE: PRT
<213> ORGANISM: Artificial Sequence
<220> FEATURE:
<223> OTHER INFORMATION: Synthetic Construct

<400> SEQUENCE: 4

Gln Ile Val Leu Thr Gln Ser Pro Ala Phe Met Ser Ala Ser Pro Gly
1               5                   10                  15

Glu Lys Val Thr Met Thr Cys Ser Ala Ser Ser Val Ser Tyr Met
            20                  25                  30

His Trp Tyr Gln Gln Lys Ser Gly Thr Ser Pro Lys Arg Trp Ile Tyr
        35                  40                  45

Ala Thr Ser Lys Val Ala Ser Gly Val Pro Ala Arg Phe Ser Gly Ser
    50                  55                  60

Gly Ser Gly Thr Ser Tyr Ser Leu Thr Ile Ser Ser Met Glu Ala Glu
65                  70                  75                  80

Asp Ala Ala Thr Tyr Tyr Cys Leu Gln Trp Ser Ser Asn Pro Tyr Thr
                85                  90                  95

Phe Gly Gly Gly Thr Lys Leu Glu Ile Lys Arg Ala Asp Ala Ala Pro
            100                 105                 110

Thr Val Ser Ile Phe Pro Pro Ser Ser Glu Gln Leu Thr Ser Gly Gly
        115                 120                 125

Ala Ser Val Val Cys Phe Leu Asn Asn Phe Tyr Pro Lys Asp Ile Asn
130                 135                 140

Val Lys Trp Lys Ile Asp Gly Ser Glu Arg Gln Asn Gly Val Leu Asn
145                 150                 155                 160

Ser Trp Thr Asp Gln Asp Ser Lys Asp Ser Thr Tyr Ser Met Ser Ser
                165                 170                 175

Thr Leu Thr Leu Thr Lys Asp Glu Tyr Glu Arg His Asn Ser Tyr Thr
            180                 185                 190

Cys Glu Ala Thr His Lys Thr Ser Thr Ser Pro Ile Val Lys Ser Phe
        195                 200                 205

Asn Arg Asn Glu Cys
    210